United States Patent
Karube

(10) Patent No.: US 9,140,887 B2
(45) Date of Patent: Sep. 22, 2015

(54) MICROSCOPE SYSTEM, FOCUS POSITION DETECTION METHOD, AND FOCUS POSITION DETECTION PROGRAM

(75) Inventor: Takuya Karube, Osaka (JP)

(73) Assignee: Keyence Corporation, Osaka (JP)

( * ) Notice: Subject to any disclaimer, the term of this patent is extended or adjusted under 35 U.S.C. 154(b) by 845 days.

(21) Appl. No.: 13/346,056

(22) Filed: Jan. 9, 2012

(65) Prior Publication Data

US 2012/0188359 A1 Jul. 26, 2012

(30) Foreign Application Priority Data

Jan. 24, 2011 (JP) ................. 2011-012033

(51) Int. Cl.
*G02B 21/00* (2006.01)
*G02B 7/04* (2006.01)
*G02B 21/24* (2006.01)

(52) U.S. Cl.
CPC .............. *G02B 21/244* (2013.01); *G02B 21/00* (2013.01); *G02B 21/0024* (2013.01)

(58) Field of Classification Search
CPC .... G02B 21/00; G02B 21/0024; G02B 21/26; H04N 7/18
USPC ...................................... 348/79, 80
See application file for complete search history.

(56) References Cited

U.S. PATENT DOCUMENTS 5,672,861 A * 9/1997 Fairley et al. ............... 250/201.3
5,912,735 A * 6/1999 Xu ................................ 356/497

FOREIGN PATENT DOCUMENTS

| JP | H08-160306 | | 6/1996 |
|----|------------|---|--------|
| JP | 09061720 A | * | 3/1997 |
| JP | H09-251128 | | 9/1997 |
| JP | 10-142516 | | 5/1998 |
| JP | 2001-059935 | | 3/2001 |
| JP | 2004-069795 | | 3/2004 |
| JP | 2007-147756 | | 6/2007 |
| JP | 2008-046484 | | 2/2008 |
| JP | 2008-083601 | | 4/2008 |
| JP | 2008-170973 | | 7/2008 |
| JP | 2008-292240 | | 12/2008 |

* cited by examiner

*Primary Examiner* — Gims Philippe
*Assistant Examiner* — Kyle Lotfi
(74) *Attorney, Agent, or Firm* — Kilyk & Bowersox, P.L.L.C.

(57) ABSTRACT

To provide a microscope system capable of automatically detecting a position of a focus of an optical system relative to an observing object. A light emitted from a laser light source is irradiated on an observing object, and the light reflected by the observing object is guided to a light receiving element. An evaluation value based on a plurality of pixel data is set so as to be smaller than an output upper limit value Emax and greater than a multiplication value En1 of a noise level. The evaluation value is calculated with the set gain while moving the objective lens in an upward direction from a current position zs1. The gain is reduced by a constant amount every time the evaluation value reaches the output upper limit value Emax. The position in the Z direction of the objective lens when the evaluation value becomes a peak is detected.

8 Claims, 15 Drawing Sheets

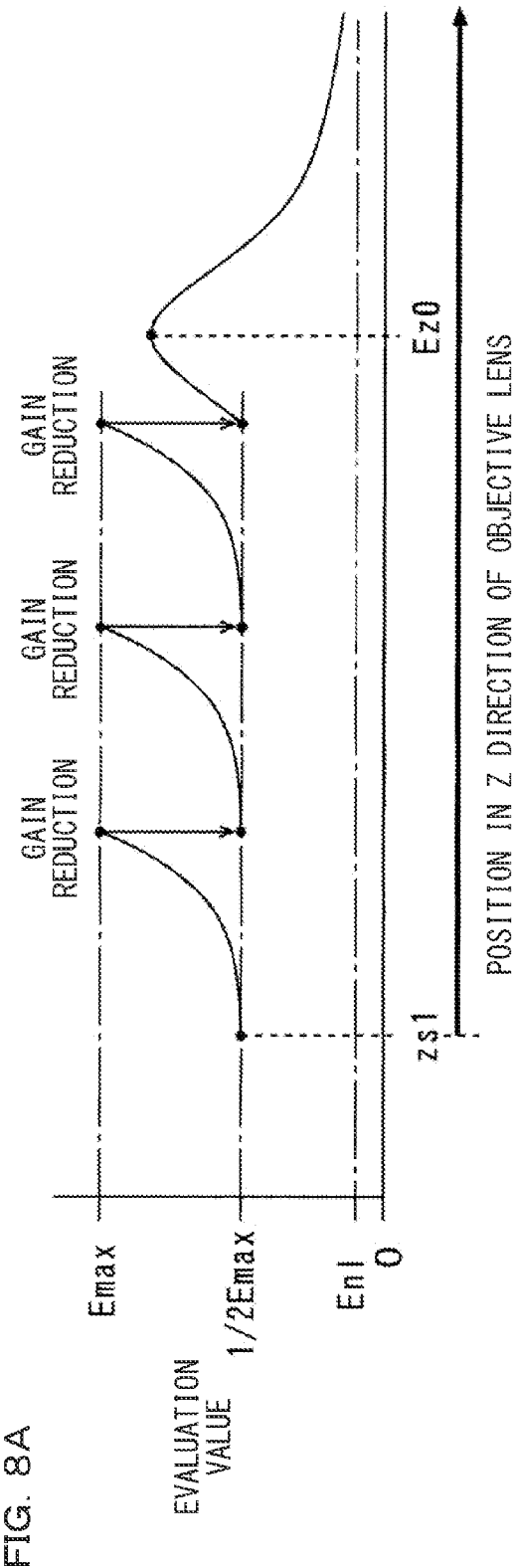
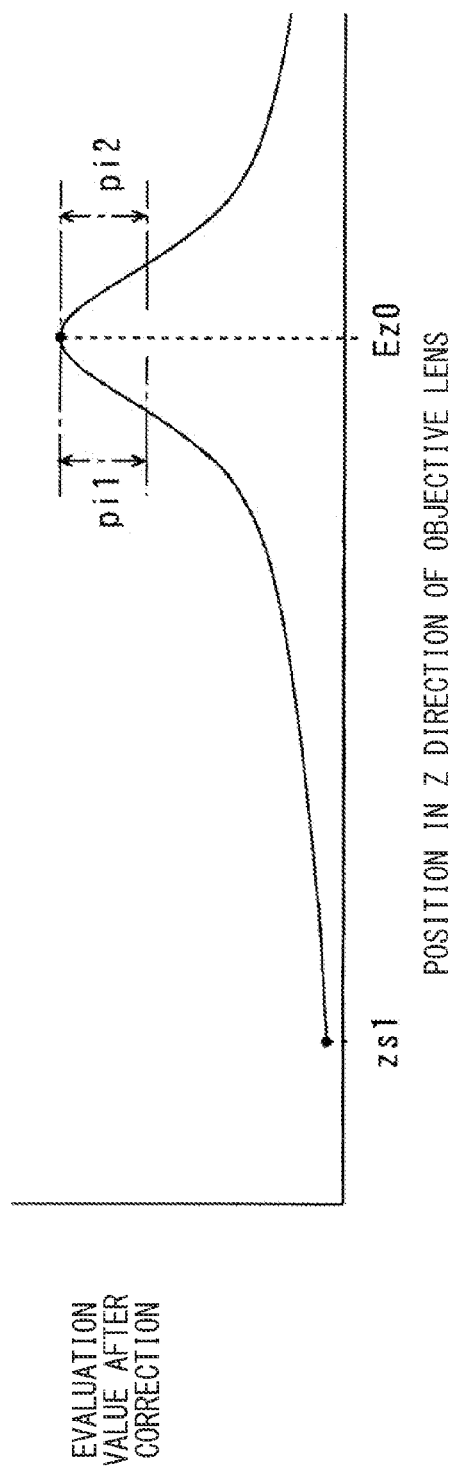

FIG. 9
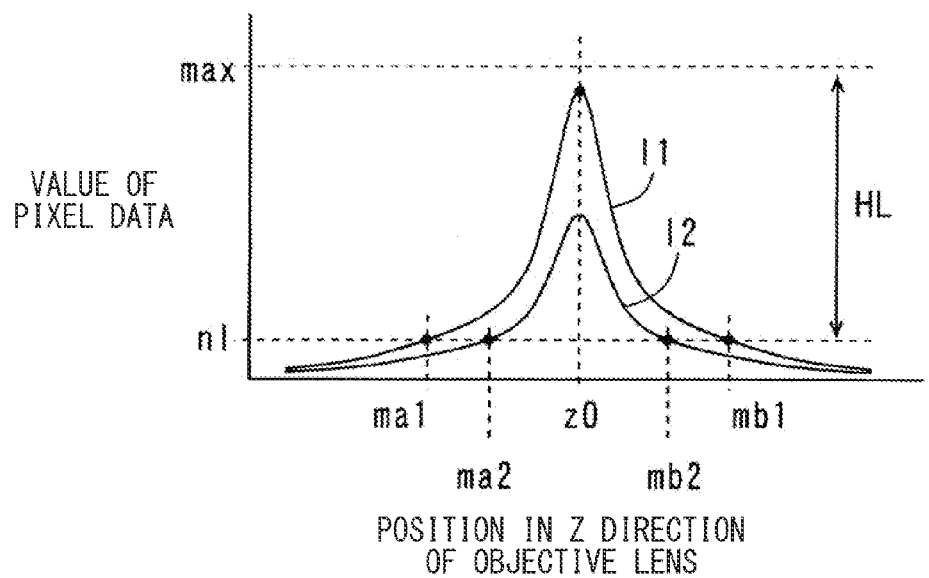
FIG. 10
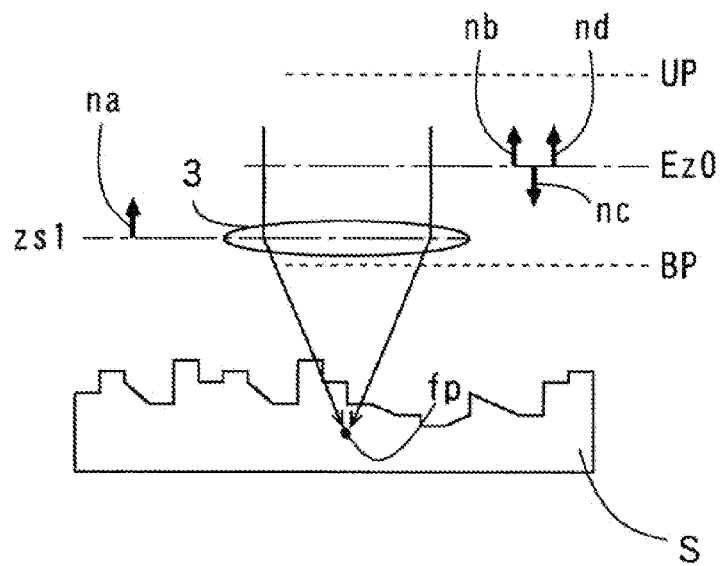
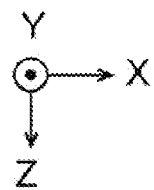

MICROSCOPE SYSTEM, FOCUS POSITION DETECTION METHOD, AND FOCUS POSITION DETECTION PROGRAM

CROSS-REFERENCE TO RELATED APPLICATIONS

The present application claims foreign priority based on Japanese Patent Application No. 2011-012033, filed Jan. 24, 2011, the contents of which is incorporated herein by reference.

BACKGROUND OF THE INVENTION

1. Field of the Invention

The present invention relates to a microscope system, a focus position detection method, and a focus position detection program.

2. Description of Related Art

In a confocal microscope, the laser light emitted from a laser light source is collected on a measuring target by an objective lens. The reflected light from the measuring target is collected by a light receiving lens, and entered to a light receiving element through a pin hole (see e.g., Japanese Laid-Open Patent Publication No. 2008-83601). The laser light is two-dimensionally scanned on the surface of the measuring target. The distribution of the light receiving quantity of the light receiving element changes by changing the relative distance between the measuring target and the objective lens. A peak of the light receiving quantity appears when focused on the surface of the measuring target. An ultradeep image having a very high focal depth can be obtained based on a peak intensity of the distribution of the light receiving quantity. Furthermore, high distribution of the surface of the measuring target can be obtained based on the peak position of the distribution of the light receiving quantity.

SUMMARY OF THE INVENTION

An output signal of a light receiving element of the confocal microscope is converted to a digital signal by an A/D converter (analog/digital converter), and output as pixel data corresponding to each pixel. Confocal image data is generated based on pixel data of a constant region of a measuring object, and a confocal image of an observing target is displayed on a display unit based on the confocal image data. The user can focus a focus of an objective lens on a desired region of the observing target by relatively moving a stage up and down with respect to the objective lens. A confocal image focused on the desired region thus can be displayed on the display unit.

However, if the gain of the light receiving element is too large in focusing, the output signal of the light receiving element saturates. In such a case, a peak does not appear in the change in the pixel data obtained by moving the stage in the up and down direction. If the gain of the light receiving element is too small, the peak in the change in the pixel data obtained by moving the stage in the up and down direction cannot be identified from the noise. In such a case, the focus of the objective lens cannot be focused on the desired region of the observing object.

Thus, the user needs to repeatedly carry out the task of moving the stage up and down while adjusting the gain of the light receiving element.

It is an object of the present invention to provide a microscope system, a focus position detection method, and a focus position detection program capable of automatically detecting a position of a focus of an optical system relative to a desired region of an observing object.

(1) A microscope system according to one embodiment of the present invention relates to a microscope system for observing a state of a surface of an observing target, the microscope system including a light source for emitting a light; a light receiving element; an optical system for irradiating the light emitted from the light source on the observing target while collecting the light, and guiding the light irradiated on the observing target to the light receiving element; a pixel data output unit for outputting pixel data corresponding to a plurality of pixels based on an output signal of the light receiving element; and a control unit for setting a sensitivity parameter for adjusting a value of the pixel data by controlling at least one of the light source, the optical system, and the light receiving element, and moving a focus of the optical system relative to the surface of the observing target to a plurality of positions in an optical axis direction of the optical system; wherein -the control unit calculates an evaluation value using a value of the pixel data corresponding to a predetermined number of pixels of the pixel data output from the pixel data output unit at each position of the focus of the optical system, assumes the calculated evaluation value as the evaluation value corresponding to the position if the calculated evaluation value is within a range between an upper limit value defined in advance and a lower limit value defined in advance, changes the set sensitivity parameter so that the calculated evaluation value is within the range if the calculated evaluation value is not within the range, corrects the evaluation value calculated at each position of the focus of the optical system after changing the sensitivity parameter according to the change of the sensitivity parameter to have the corrected evaluation value as the evaluation value corresponding to each position, and detects the position of the focus of the optical system indicating a peak value in a distribution of a plurality of evaluation values corresponding to the plurality of positions of the focus of the optical system.

In such microscope system, the light emitted from the light source is irradiated on the observing target while being collected by the optical system, and the light irradiated on the observing target is guided to the light receiving element. Pixel data corresponding to a plurality of pixels is output based on the output signal of the light receiving element.

The focus of the optical system relative to the surface of the observing object is moved to a plurality of positions in the optical axis direction by the control unit. The evaluation value using the value of the pixel data corresponding to a predetermined number of pixels of the pixel data output from the pixel data output unit is calculated at each position of the focus of the optical system.

If the calculated evaluation value is within a range between an upper limit value defined in advance and a lower limit value defined in advance, the calculated evaluation value becomes the evaluation value corresponding to the relevant position. If the calculated evaluation value is not within the range, on the other hand, the sensitivity parameter is changed so that the calculated evaluation value is within the range, and the evaluation value calculated at each position of the focus of the optical system after changing the sensitivity parameter is corrected according to the change of the sensitivity parameter. The corrected evaluation value becomes the evaluation value corresponding to each position.

The evaluation value thus does not saturate at the upper limit value, and the sensitivity parameter is automatically set and changed so that the peak of the evaluation value does not become smaller than the lower limit value. When the sensitivity parameter is changed, the evaluation value calculated after the change is corrected. The distribution of the plurality of evaluation values corresponding to the plurality of positions of the focus of the optical system is obtained in such manner.

Therefore, the position of the focus of the optical system indicating a peak value in a distribution of the plurality of evaluation values corresponding to the plurality of positions of the focus of the optical system can be accurately detected. As a result, the sensitivity parameter is automatically set to an appropriate value, and the position of the focus of the optical system relative to the desired region of the observing object is automatically detected.

(2) The control unit may set the sensitivity parameter by controlling at least one of a quantity of light emitted from the light source, an attenuation amount of the light in the optical system, and a gain of the light receiving element. In this case, the sensitivity parameter is automatically set and changed by the control unit.

(3) The control unit may calculate the evaluation value at a plurality of positions in the optical axis direction of the optical system by moving the focus of the optical system in one direction after setting the sensitivity parameter so that the evaluation value is within a range between the upper limit value and the lower limit value at an initial position of the focus of the optical system, and move the position of the focus of the optical system in a direction opposite to the one direction if a peak value is not indicated in the distribution of the plurality of evaluation values corresponding to the plurality of positions of the focus of the optical system by the movement in the one direction.

In this case, the position of the focus of the optical system indicating the peak value can be accurately detected in the distribution of the plurality of evaluation values corresponding to the plurality of positions of the focus of the optical system regardless of the initial position of the focus of the optical system.

(4) The control unit may reduce the sensitivity parameter when the evaluation value reaches the upper limit value by the movement of the focus of the optical system in the optical axis direction.

In this case, the control unit can prevent the evaluation value from saturating with a simple process.

(5) The microscope system further includes an image data generation unit for generating image data based on the pixel data output from the pixel data output unit; and a display unit for displaying an image based on the image data generated by the image data generation unit; wherein the control unit may move the focus of the optical system so that the focus of the optical system coincides with a detected position.

In this case, the image is displayed on the display unit with the focus of the optical system focused on the region corresponding to a predetermined number of pixels. Therefore, the user can observe the image of the observing object in which the focus of the optical system is focused in the desired region without performing the troublesome focusing task.

(6) The control unit may calculate the evaluation value at a plurality of positions in the optical axis direction of the optical system by moving the focus of the optical system in one direction from the detected position, determine the position of the focus of the optical system at a time point the calculated evaluation value becomes smaller than or equal to a detection limit defined in advance as a movement limit position on one side, calculate the evaluation value at a plurality of positions in the optical axis direction of the optical system by moving the position of the focus of the optical system in a direction opposite to the one direction from the detected position, and determine the position of the focus of the optical system at a time point the calculated evaluation value becomes smaller than or equal to the detection limit as a movement limit position on other side.

In this case, the position of the focus of the optical system in which the pixel data indicates the peak value can be detected for each of the plurality of pixels by moving the position of the focus of the optical system within a range of the movement limit position on one side and the movement limit position on the other side. As a result, the focus of the optical system can be focused on the surface of the observing object for each of the plurality of pixels.

(7) A focus position detection method according to another embodiment of the present invention relates to a focus position detection method for detecting a position of a focus of an optical system arranged in a microscope system, the method including the steps of irradiating a light emitted from a light source on an observing target while collecting the light through the optical system, and guiding the light irradiated on the observing target to a light receiving element; outputting pixel data corresponding to a plurality of pixels based on an output signal of the light receiving element; and setting a sensitivity parameter for adjusting a value of the pixel data by controlling at least one of the light source, the optical system, or the light receiving element by a control unit, and moving a focus of the optical system relative to the surface of the observing target to a plurality of positions in an optical axis direction of the optical system by the control unit; wherein the step of moving includes calculating an evaluation value using a value of the pixel data corresponding to a predetermined number of pixels of the pixel data output from a pixel data output unit at each position of the focus of the optical system by the control unit, assuming the calculated evaluation value as the evaluation corresponding to the position if the calculated evaluation value is within a range between an upper limit value defined in advance and a lower limit value defined in advance, changing the set sensitivity parameter so that the calculated evaluation value is within the range if the calculated evaluation value is not within the range, correcting the evaluation value calculated at each position of the focus of the optical system after changing the sensitivity parameter according to the change of the sensitivity parameter to have the corrected evaluation value as the evaluation value corresponding to each position, and detecting the position of the focus of the optical system indicating a peak value in a distribution of a plurality of evaluation values corresponding to the plurality of positions of the focus of the optical system by the control unit.

In the focus position detection method, the light emitted from a light source is irradiated on an observing target while being collected through the optical system, and the light irradiated on the observing target is guided to a light receiving element. The pixel data corresponding to a plurality of pixels is output based on an output signal of the light receiving element.

The focus of the optical system relative to the surface of the observing object is moved to a plurality of positions in the optical axis direction by the control unit. The evaluation value using the value of the pixel data corresponding to a predetermined number of pixels of the pixel data output from the pixel data output unit is calculated at each position of the focus of the optical system.

If the calculated evaluation value is within a range between an upper limit value defined in advance and a lower limit value defined in advance, the calculated evaluation value becomes the evaluation value corresponding to the relevant position. If the calculated evaluation value is not within the range, on the other hand, the sensitivity parameter is changed so that the calculated evaluation value is within the range, and the evaluation value calculated at each position of the focus of the optical system after changing the sensitivity parameter is corrected according to the change of the sensitivity parameter. The corrected evaluation value becomes the evaluation value corresponding to each position.

The evaluation value thus does not saturate at the upper limit value, and the sensitivity parameter is automatically set and changed so that the peak of the evaluation value does not become smaller than the lower limit value. When the sensitivity parameter is changed, the evaluation value calculated after the change is corrected. The distribution of the plurality of evaluation values corresponding to the plurality of positions of the focus of the optical system is obtained in such manner.

Therefore, the position of the focus of the optical system indicating a peak value in a distribution of the plurality of evaluation values corresponding to the plurality of positions of the focus of the optical system can be accurately detected. As a result, the sensitivity parameter is automatically set to an appropriate value, and the position of the focus of the optical system relative to the desired region of the observing object is automatically detected.

(8) A focus position detection program according to another further embodiment of the present invention relates to a focus position detection program for causing a processing device to execute a focus position detection process for detecting a position of a focus of an optical system arranged in a microscope system, the program causing the processing device to execute the processes of irradiating a light emitted from a light source on an observing target while collecting the light through the optical system, and guiding the light irradiated on the observing target to a light receiving element; outputting pixel data corresponding to a plurality of pixels based on an output signal of the light receiving element; and setting a sensitivity parameter for adjusting a value of the pixel data by controlling at least one of the light source, the optical system, or the light receiving element by the control unit, and moving a position of a focus of the optical system relative to the surface of the observing target in an optical axis direction of the optical system by the control unit; wherein the process of moving includes calculating an evaluation value using a value of the pixel data corresponding to a predetermined number of pixels of the pixel data output from a pixel data output unit at each position of the focus of the optical system by the control unit, assuming the calculated evaluation value as the evaluation value corresponding to the position if the calculated evaluation value is within a range between an upper limit value defined in advance and a lower limit value defined in advance, changing the set sensitivity parameter so that the calculated evaluation value is within the range if the calculated evaluation value is not within the range, correcting the evaluation value calculated at each position of the focus of the optical system after changing the sensitivity parameter according to the change of the sensitivity parameter to have the corrected evaluation value as the evaluation value corresponding to each position, and detecting the position of the focus of the optical system indicating a peak value in a distribution of a plurality of evaluation values corresponding to the plurality of positions of the focus of the optical system by the control unit.

In the focus position detection program, the light emitted from a light source is irradiated on an observing target while being collected through the optical system, and the light irradiated on the observing target is guided to a light receiving element. The pixel data corresponding to a plurality of pixels is output based on an output signal of the light receiving element.

The focus of the optical system relative to the surface of the observing object is moved to a plurality of positions in the optical axis direction by the control unit. The evaluation value using the value of the pixel data corresponding to a predetermined number of pixels of the pixel data output from the pixel data output unit is calculated at each position of the focus of the optical system.

If the calculated evaluation value is within a range between an upper limit value defined in advance and a lower limit value defined in advance, the calculated evaluation value becomes the evaluation value corresponding to the relevant position. If the calculated evaluation value is not within the range, on the other hand, the sensitivity parameter is changed so that the calculated evaluation value is within the range, and the evaluation value calculated at each position of the focus of the optical system after changing the sensitivity parameter is corrected according to the change of the sensitivity parameter. The corrected evaluation value becomes the evaluation value corresponding to each position.

The evaluation value thus does not saturate at the upper limit value, and the sensitivity parameter is automatically set and changed so that the peak of the evaluation value does not become smaller than the lower limit value. When the sensitivity parameter is changed, the evaluation value calculated after the change is corrected. The distribution of the plurality of evaluation values corresponding to the plurality of positions of the focus of the optical system is obtained in such manner.

Therefore, the position of the focus of the optical system indicating a peak value in a distribution of the plurality of evaluation values corresponding to the plurality of positions of the focus of the optical system can be accurately detected. As a result, the sensitivity parameter is automatically set to an appropriate value, and the position of the focus of the optical system relative to the desired region of the observing object is automatically detected.

According to the present invention, the position of the focus of the optical system relative to the desired region of the observing object is automatically detected.

BRIEF DESCRIPTION OF THE DRAWINGS

FIGS. 8A and 8B are views for describing the peak position searching process using an evaluation value;

FIG. 9 is a view for describing a relationship of the position in the Z direction of the objective lens and the value of the valid pixel data for one pixel;

FIG. 10 is a view for describing the setting method of the upper limit position and the lower limit position in the Z direction of the objective lens at the time of the generation of the height image data and the ultradeep image data;

DETAILED DESCRIPTION OF PREFERRED EMBODIMENTS

A microscope system according to one embodiment of the present invention will be described with reference to the drawings. Hereinafter, a confocal microscope system will be described as an example of the microscope system.

(1) Basic Configuration of Confocal Microscope System

Figure 1:
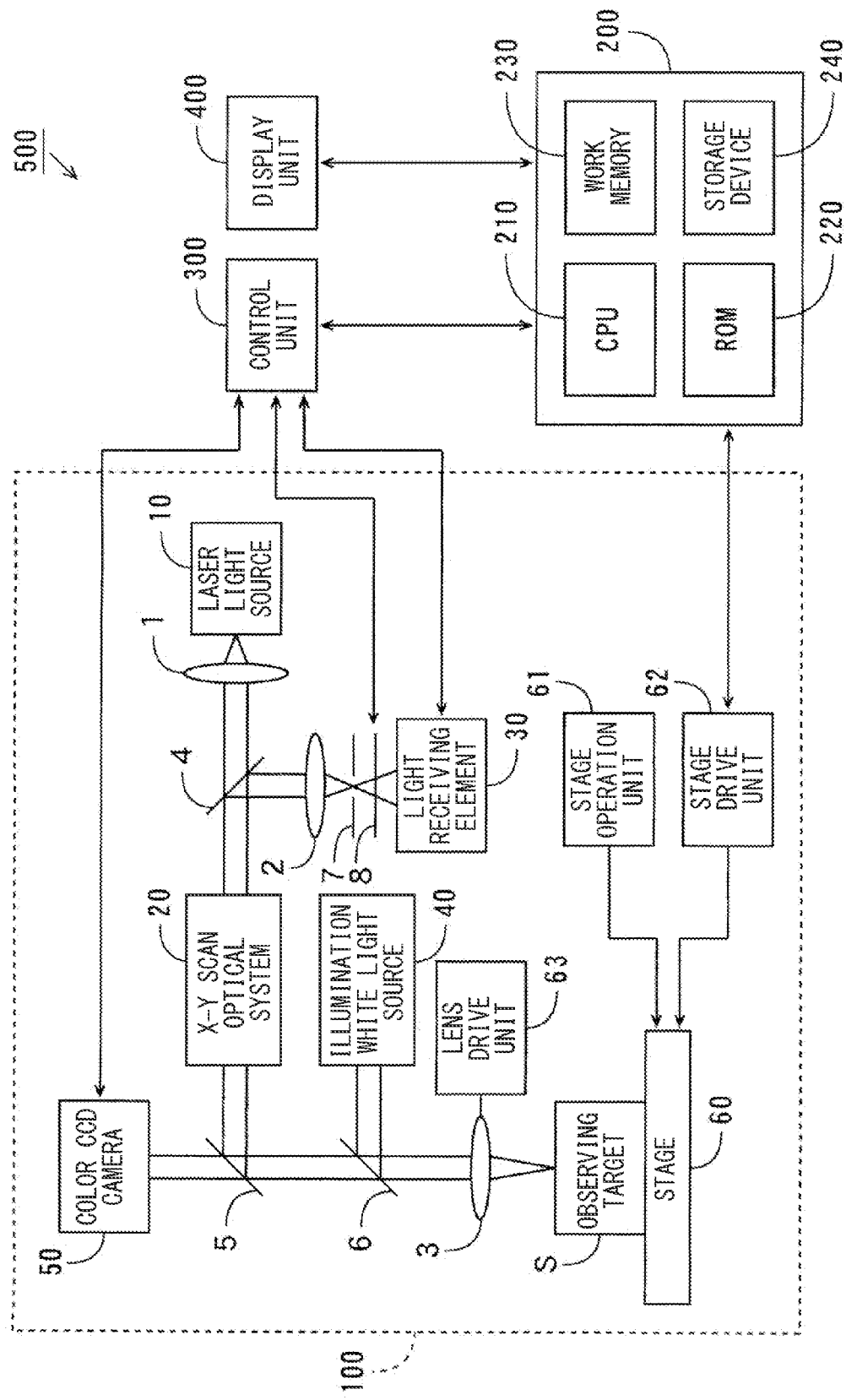
FIG. 1 is a block diagram showing a configuration of a confocal microscope system according to one embodiment of the present invention.

FIG. 1 is a block diagram showing a configuration of a confocal microscope system 500 according to one embodiment of the present invention. As shown in FIG. 1, the confocal microscope system 500 includes a measurement unit 100, a PC (Personal Computer) 200, a control unit 300, and a display unit 400. The measurement unit 100 includes a laser light source 10, an X-Y scan optical system 20, a light receiving element 30, an illumination white light source 40, a color CCD (Charge Coupled Device) camera 50, and a stage 60. An observing target S is mounted on the stage 60.

The laser light source 10 is a semiconductor laser, for example. The laser light emitted from the laser light source 10 is converted to a parallel light by the lens 1, and then transmitted through the half mirror 4 to enter the X-Y scan optical system 20. Other light sources such as a mercury lamp may be used instead of the laser light source 10. In this case, a band-pass filter is arranged between the light source such as the mercury lamp and the X-Y scan optical system 20. The light emitted from the light source such as the mercury lamp becomes a monochromatic light by passing through the band-pass filter, and then entered to the X-Y scan optical system 20.

The X-Y scan optical system 20 is, for example, a galvano mirror. The X-Y scan optical system 20 has a function of scanning the laser light in the X direction and the Y direction on the surface of the observing target S on the stage 60. The definition of the X direction, the Y direction, and the Z direction will be made later. The laser light scanned by the X-Y scan optical system 20 is reflected by a half mirror 5, and then transmitted through a half mirror 6, and collected on the observing target S on the stage 60 by an objective lens 3. A polarized beam splitter may be used in place of the half mirrors 4 to 6.

The laser light reflected by the observing target S is transmitted through the objective lens 3 and the half mirror 6, and then reflected by the half mirror 5 and transmitted through the X-Y scan optical system 20. The laser light transmitted through the X-Y scan optical system 20 is reflected by the half mirror 4, collected by the lens 2, and transmitted through a pin hole of a pin hole member 7 and an ND (Neutral Density) filter 8 to enter a light receiving element 30. Thus, a reflective confocal microscope system 500 is used in the present embodiment, but a transmissive confocal microscope system may be used when the observing target S is a transparent body such as a cell.

The pin hole of the pin hole member 7 is arranged at a focus position of the lens 2. The ND filter 8 is used to attenuate the intensity of the laser light entering the light receiving element 30. Thus, the ND filter 8 does not need to be arranged if the intensity of the laser light is sufficiently attenuated.

In the present embodiment, the light receiving element 30 is a photomultiplier. A photodiode and an amplifier may be used for the light receiving element 30. The light receiving element 30 outputs an analog electric signal (hereinafter referred to as light receiving signal) corresponding to the light receiving quantity. The control unit 300 includes two A/D converters (analog/digital converter), a FIFO (First In First Out) memory, and a CPU (Central Processing Unit). The light receiving signal output from the light receiving element 30 is sampled at a constant sampling period and converted to a digital signal by one A/D converter of the control unit 300. The digital signal output from the A/D converter is sequentially accumulated in the FIFO memory. The digital signal accumulated in the FIFO memory is sequentially transferred to the PC 200 as pixel data.

The illumination white light source 40 is, for example, a halogen lamp or a white LED (light emitting diode). The white light generated by the illumination white light source 40 is reflected by the half mirror 6, and then collected on the observing target S on the stage 60 by the objective lens 3.

The white light reflected by the observing target S is transmitted through the objective lens 3, the half mirror 6, and the half mirror 5, and entered to the color CCD camera 50. An imaging element such as a CMOS (Complementary Metal Oxide Semiconductor) image sensor may be used in place of the color CCD camera 50. The color CCD camera 50 outputs an electric signal corresponding to the light receiving quantity. The output signal of the color CCD camera 50 is sampled at a constant sampling period and converted to a digital signal by the other A/D converter of the control unit 300. The digital signal output from the A/D converter is sequentially transferred to the PC 200 as camera data.

The control unit 300 provides the pixel data and the camera data to the PC 200, and also controls the color CCD camera 50 based on a command from the PC 200. The control unit 300 controls the gain (light receiving sensitivity) of the light receiving element 30 as the sensitivity parameter based on a command from the PC 200. The sensitivity parameter is the parameter for adjusting the value of the pixel data to be acquired by the control unit 300 with the state (reflectivity, direction, roughness, color, etc.) of the surface of the observing target S under a constant condition.

Further, the control unit 300 controls the X-Y scan optical system 20 based on the command from the PC 200 to scan the laser light in the X direction and the Y direction on the observing target S.

The objective lens 3 is arranged to be movable in the Z direction by a lens drive unit 63. The control unit 300 controls the lens drive unit 63 based on a command from the PC 200 to move the objective lens 3 in the Z direction. The relative position in the Z direction of the observing target S with respect to the objective lens 3 then can be changed.

The PC 200 includes a CPU (Central Processing Unit) 210, a ROM (Read Only Memory) 220, a work memory 230, and a storage device 240. The ROM 220 stores a system program. The work memory 230 includes a RAM (Random Access Memory) and is used for the processing of various data. The storage device 240 includes a hard disc, and the like. The storage device 240 stores a focus position detection program, and is used to save various data such as the pixel data and the camera data provided from the control unit 300. The details of the focus position detection program will be described later.

The CPU 210 generates image data based on the pixel data provided from the control unit 300. Hereinafter, the image data generated based on the pixel data is referred to as confocal image data. An image displayed based on the confocal image data is referred to as a confocal image.

The CPU 210 generates image data based on the camera data provided from the control unit 300. Hereinafter, the image data generated based on the camera data is referred to as camera image data. An image displayed based on the camera image data is referred to as a camera image.

The CPU 210 carries out various types of processing using the task memory 230 on the generated confocal image data and camera image data, and causes the display unit 400 to display the confocal image based on the confocal image data and the camera image based on the camera image data. The CPU 210 provides a drive pulse to a stage drive unit 62, to be described later.

The display unit 400 is configured, for example, by a liquid crystal display panel or an organic EL (Electro Luminescence) panel.

The stage 60 has an X direction movement mechanism, a Y direction movement mechanism, and a Z direction movement mechanism. A stepping motor is used for the X direction movement mechanism, the Y direction movement mechanism, and the Z direction movement mechanism.

The X direction movement mechanism, the Y direction movement mechanism, and the Z direction movement mechanism of the stage 60 are driven by a stage operation unit 61 and the stage drive unit 62. The user manually operates the stage operation unit 61 to move the stage 60 relatively in the X direction, the Y direction, and the Z direction with respect to the objective lens 3.

The stage drive unit 62 supplies current to the stepping motor of the stage 60 based on the drive pulse provided by the PC 200 to move the stage 60 relatively in the X direction, the Y direction, or the Z direction with respect to the objective lens 3.

(2) Confocal Image, Ultradeep Image, and Height Image

Figure 2:
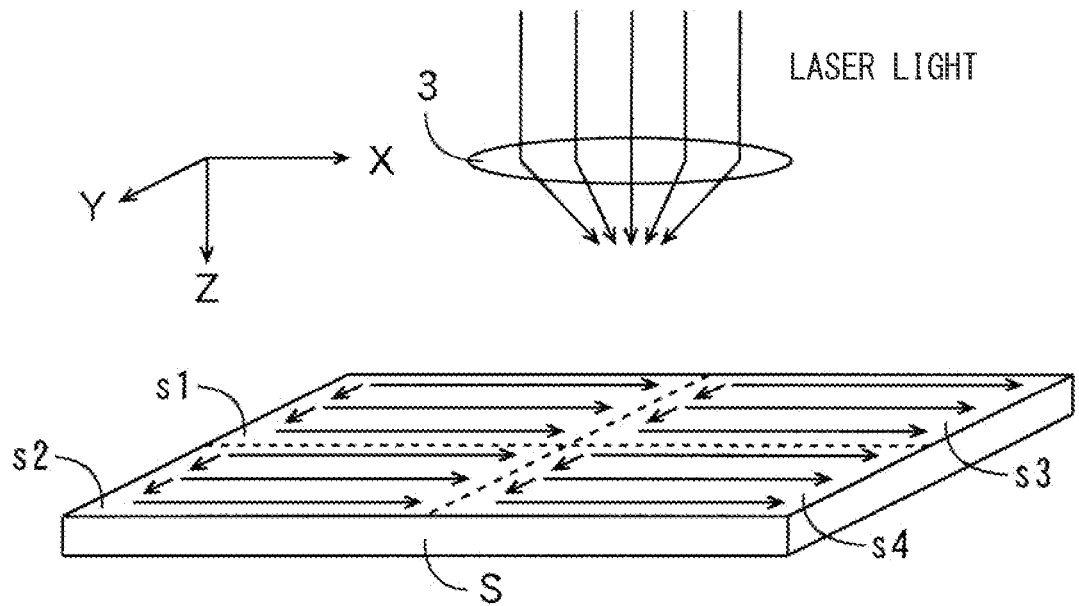
FIG. 2 is a view for defining an X direction, a Y direction, and a Z direction.

FIG. 2 is a view for defining the X direction, the Y direction, and the Z direction. As shown in FIG. 2, the laser light collected by the objective lens 3 is irradiated on the observing target S. In the present embodiment, the direction of the optical axis of the objective lens 3 is defined as the Z direction. In a plane orthogonal to the Z direction, two directions orthogonal to each other are respectively defined as the X direction and the Y direction. The X direction, the Y direction, and the Z direction are respectively shown with arrows X, Y, Z.

The relative position of the surface of the observing target S with respect to the objective lens 3 in the Z direction is referred to as a position in the Z direction of the observing target S. The confocal image data is generated for every unit region. The unit region is defined by the magnification of the objective lens 3.

The laser light is scanned in the X direction at the end in the Y direction in the unit region by the X-Y scan optical system 20 with the position in the Z direction of the observing target S constant. After the scanning in the X direction is finished, the laser light is shifted by a constant interval in the Y direction by the X-Y scan optical system 20. The laser light is scanned in the X direction in such state. The scanning in the X direction and the Y direction of the unit region is finished by repeating the scanning in the X direction and the shift in the Y direction of the laser light in the unit region. The objective lens 3 is then moved in the Z direction. The scanning in the X direction and the Y direction of the unit region is thereby carried out in a constant state in which the position in the Z direction of the objective lens 3 differs from the previous time. The scanning in the X direction and the Y direction of the unit region is carried out at a plurality of positions in the Z direction of the observing target S.

The confocal image data is generated by the scanning in the X direction and the Y direction for every position in the Z direction of the observing target S. A plurality of confocal image data in which the position in the Z direction differs in the unit region is thereby generated.

The number of pixels in the X direction of the confocal image data is defined by the scanning speed in the X direction of the laser light by the X-Y scan optical system 20 and the sampling period of the control unit 300. The number of sampling in one scanning (one scanning line) in the X direction becomes the number of pixels in the X direction. The number of pixels in the Y direction of the confocal image data of the unit region is defined by the amount of shift in the Y direction of the laser light by the X-Y scan optical system 20 every time the scanning in the X direction is finished. The number of scanning lines in the Y direction becomes the number of pixels in the Y direction. The number of confocal image data of the unit region is defined by the number of movements of the objective lens 3 in the Z direction. The ultradeep image data and the height image data are generated through a method, to be described later, based on the plurality of confocal image data of the unit region.

In the example of FIG. 2, a plurality of confocal image data of the observing target S in a unit region s1 is generated and the ultradeep image data and the height image data of the unit region s1 are generated at a first position of the stage 60. Then, the stage 60 is sequentially moved, so that the plurality of confocal image data of the observing target S in unit regions s2 to s4 and the ultradeep image data and the height image data of the unit regions s2 to s4 are generated. In this case, the unit regions s1 to s4 may be set so that one part of the adjacent unit regions overlap each other. Thus, the ultradeep image data and the height image data of the plurality of unit regions s1 to s4 can be coupled at high accuracy by performing pattern matching. In particular, if the total area of the plurality of unit regions is greater than an acquiring range of the pixel data, to be described later, the portion corresponding to the area of the portion running out from the acquiring range is set as the overlapping portion.

Figure 3:
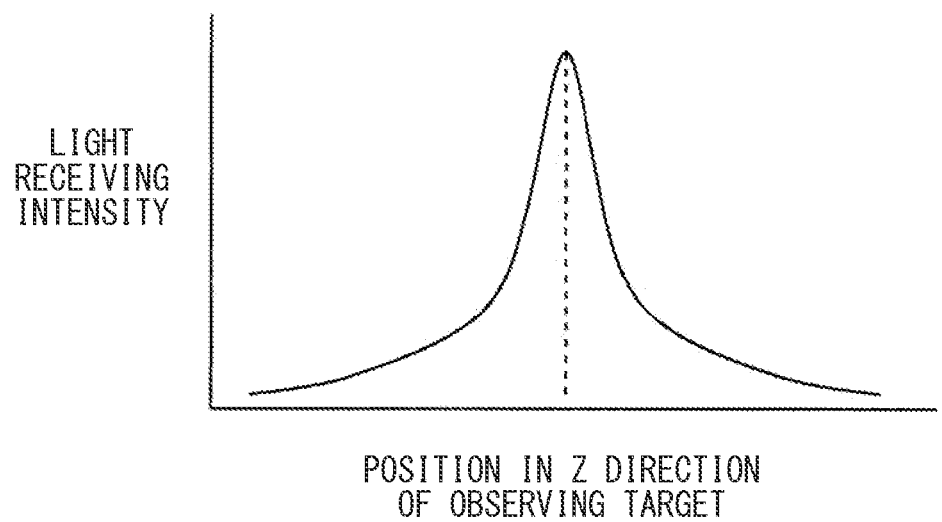
FIG. 3 is a view showing a relationship of a position in a Z direction of the observing target and the light receiving intensity of the light receiving element for one pixel.

FIG. 3 is a view showing a relationship of the position in the Z direction of the observing target S and the light receiving intensity of the light receiving element 30 for one pixel. As shown in FIG. 1, the pin hole of the pin hole member 7 is arranged at the focus position of the lens 2. Thus, if the surface of the observing target S is at the focus position of the objective lens 3, the laser light reflected by the observing target S is collected at the position of the pin hole of the pin hole member 7. Thus, the majority of the laser light reflected by the observing target S is passed through the pin hole of the pin hole member 7 to enter the light receiving element 30. In this case, the light receiving intensity of the light receiving element 30 becomes a maximum. The voltage value of the light receiving signal output from the light receiving element 30 thus becomes a maximum.

If the surface of the observing target S is at a position the focus position of the objective lens 3 is deviated, the laser light reflected by the observing target S is collected at the position front or back of the pin hole of the pin hole member 7. Thus, most of the laser light reflected by the observing target S is shielded at the peripheral portion of the pin hole of the pin hole member 7, and the light receiving intensity of the light receiving element 30 lowers. The voltage value of the light receiving signal output from the light receiving element 30 thus lowers.

Therefore, a peak appears in the distribution of the light receiving intensity of the light receiving element 30 with the surface of the observing target S at the focus position of the objective lens 3. The distribution of the light receiving intensity in the Z direction is obtained for every pixel from the plurality of confocal image data of each unit region. Thus, the peak position and the peak intensity (light receiving intensity of peak) of the light receiving intensity distribution are obtained for every pixel.

The data representing the peak position in the Z direction for a plurality of pixels of each unit region is referred to as a height image data, and the image displayed based on the height image data is referred to as a height image. The height image represents the surface shape of the observing target S. The data representing the peak intensity for a plurality of pixels of each unit region is referred to as an ultradeep image data, and the image displayed based on the ultradeep image data is referred to as an ultradeep image. The ultradeep image is an image obtained with the focus of the objective lens 3 on all the portions of the surface of the observing target S. The PC 200 generates a plurality of confocal image data of the unit region based on a plurality of pixel data of the unit region provided from the control unit 300, and generates the height image data and the ultradeep image data of the unit region based on a plurality of confocal image data.

(3) Autofocus Process, and Upper and Lower Limit Automatic Setting Process

Figure 4:
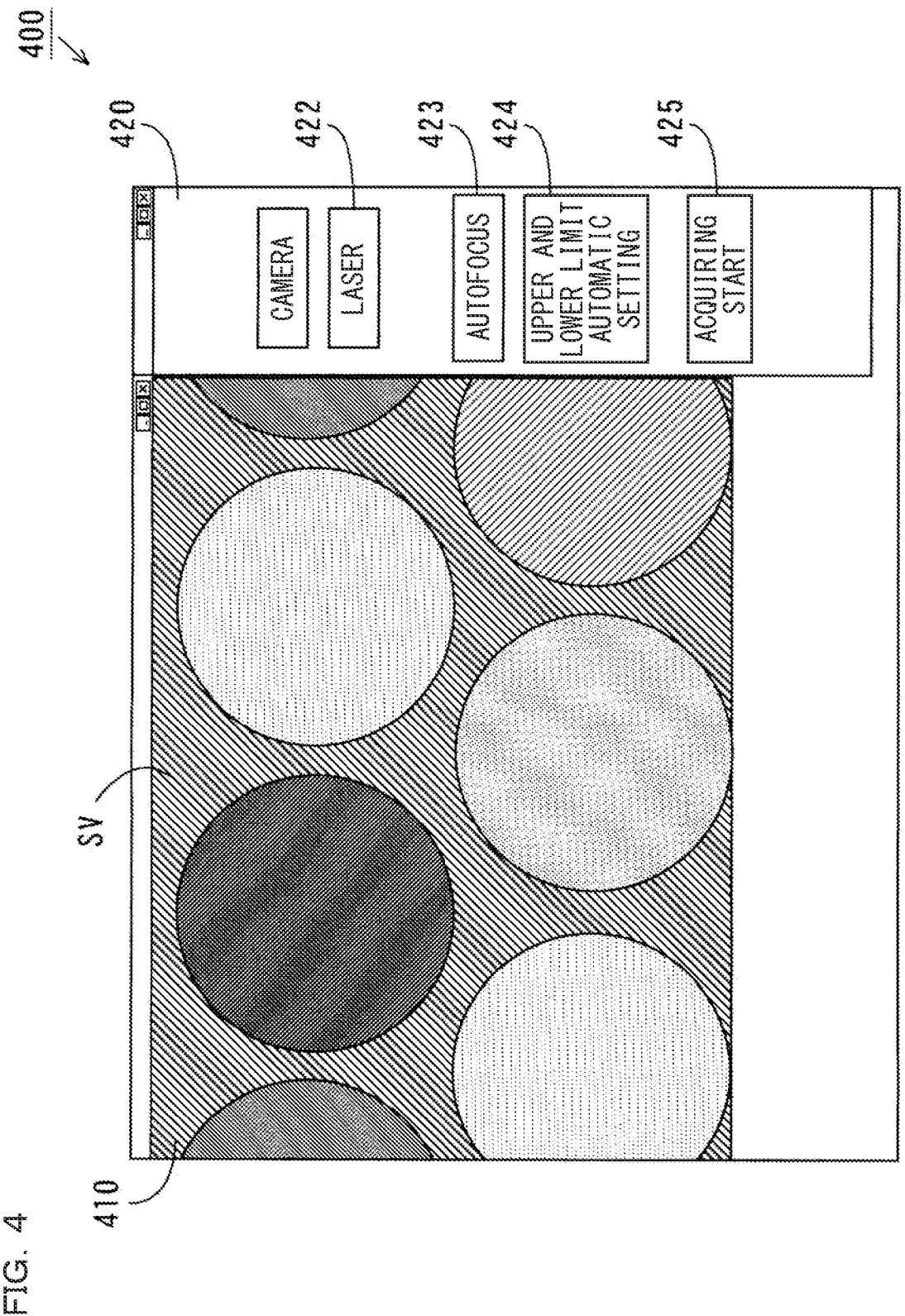
FIG. 4 is a view showing one display example of the display unit.

FIG. 4 is a view showing one display example of the display unit 400. As shown in FIG. 4, an image display region 410 and a condition setting region 420 are displayed on a screen of the display unit 400. A confocal image based on the confocal image data and a camera image based on the camera image data are displayed in the image display region 410. The condition setting region 420 displays a confocal image button 422, an autofocus button 423, an upper and lower limit automatic setting button 424, and an acquiring start button 425.

The user mounts the observing object S on the stage 60 of the confocal microscope system 500 of FIG. 1. The user operates the confocal image button 422 of the condition setting region 420 of FIG. 4 using a pointing device such as a mouse connected to the PC 200. The control unit 300 thereby sequentially provides the pixel data to the PC 200. The CPU 210 of the PC 200 generates the confocal image data based on the pixel data provided by the control unit 300, and causes the image display region 410 of the display unit 400 to display the confocal image SV of the observing object S.

When the user operates the autofocus button 423 of the condition setting region 420 with the confocal image SV displayed on the display unit 400, the autofocus process, to be described later, is executed.

The autofocus process is a process of automatically adjusting the position in the Z direction of the objective lens 3 to match the focus position of the objective lens 3 to one part of the surface of the observing object S. The user then can observe the confocal image SV with the focus on one portion of the surface of the observing object S. The details of the autofocus process will be described later.

When the user operates the upper and lower limit automatic setting button 424 of the condition setting region 420, the upper and lower limit automatic setting process, to be described later, is executed.

The upper and lower limit automatic setting process is a process of setting the upper limit position and the lower limit position in the Z direction of the objective lens 3 that moves at the time of the generation of the height image data and the ultradeep image data. The details of the upper and lower limit automatic setting process will be described later.

When the user operates the acquiring start button 425 of the condition setting region 420 after the upper and lower limit automatic setting process is executed, the laser light is scanned in the X direction and the Y direction of the unit region at a plurality of positions in the Z direction between the set upper limit position and the lower limit position, so that plural pixel data are acquired. A plurality of confocal image data corresponding to a plurality of different positions in the Z direction is generated in the unit region, and the height image data and the ultradeep image data are generated based on the plurality of generated confocal image data.

Figure 5:
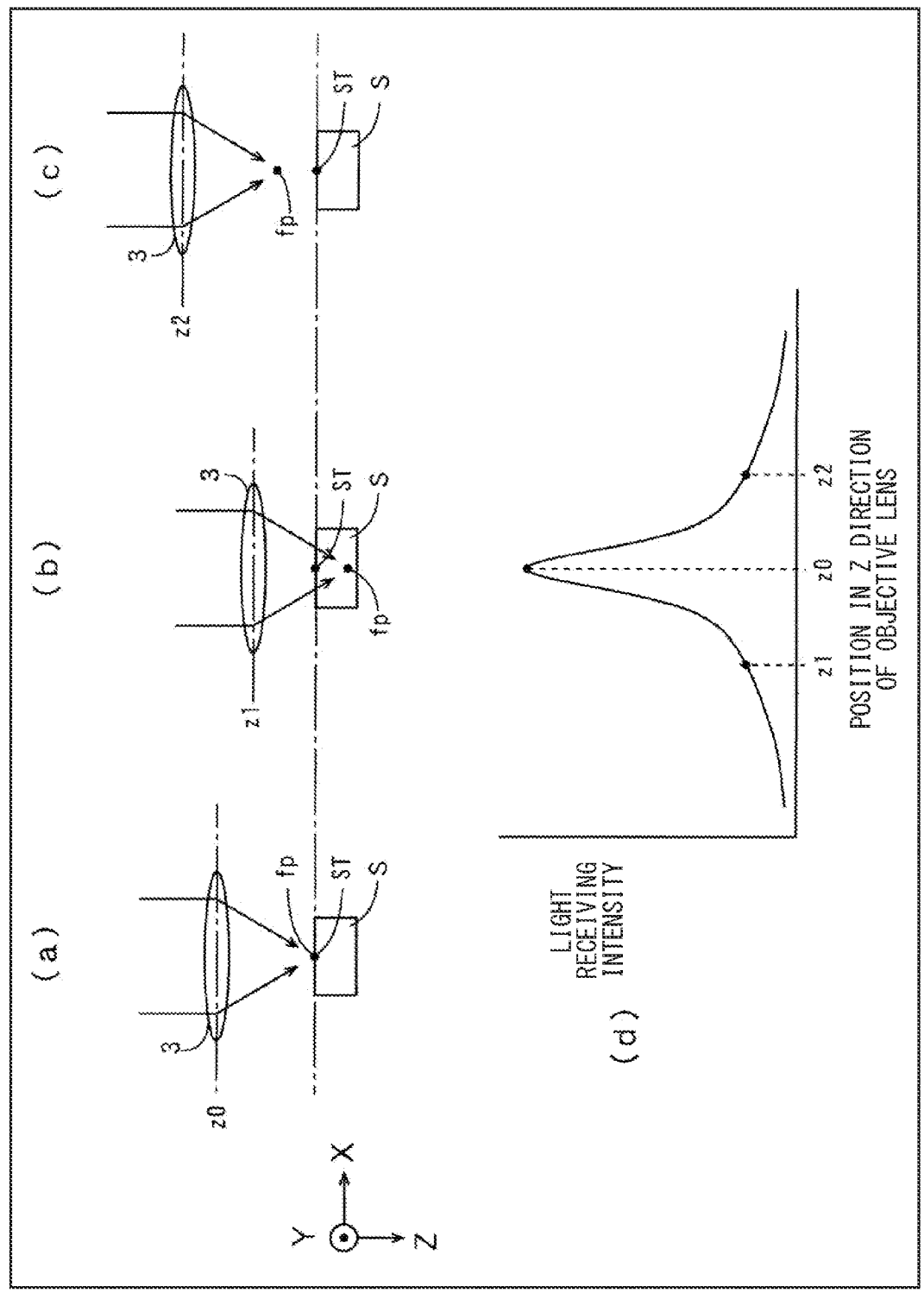
FIGS. 5A to 5D are views for describing a relationship of the position in the Z direction of the objective lens and the light receiving intensity of the light receiving element for one pixel.

(4) Details of Autofocus Process (4-1) Position in Z Direction of Objective Lens FIGS. 5A to 5D are views for describing a relationship of the position in the Z direction of the objective lens 3 and the light receiving intensity of the light receiving element 30 for one pixel. FIG. 5D shows a relationship of the position in the Z direction of the objective lens 3 and the light receiving intensity of the light receiving element 30. In FIG. 5D, the vertical axis shows the light receiving intensity of the light receiving element 30 and the horizontal axis shows the position in the Z direction of the objective lens 3.

As shown in FIG. 5A, the light receiving intensity of the light receiving element 30 has a peak when the focus position fp of the objective lens 3 is at one part ST of the surface of the observing object S. The position in the Z direction of the objective lens 3 at which the light receiving intensity becomes a peak is referred to as a peak position z0.

FIG. 5B shows a state in which the objective lens 3 is at a position z1 closer than the peak position z0 with respect to the observing object S. In this case, the light receiving intensity of the light receiving element 30 is sufficiently lower than the peak, as shown in FIG. 5D, since the surface of the observing object S is at a position deviated from the focus position fp of the objective lens 3.

FIG. 5C shows a state in which the objective lens 3 is at a position z2 farther than the peak position z0 with respect to the observing object S. In this case, the light receiving intensity of the light receiving element 30 is sufficiently lower than the peak, as shown in FIG. 5D, since the surface of the observing object S is at a position deviated from the focus position fp of the objective lens 3.

As shown in FIG. 5D, the light receiving intensity of the light receiving element 30 becomes greater as the objective lens 3 moves closer to the peak position z0 from the position proximate to the observing object S. Furthermore, the light receiving intensity of the light receiving element 30 becomes smaller as the objective lens 3 moves away from the peak position z0 with respect to the observing object S. Moreover, the light receiving intensity of the light receiving element 30 greatly changes when the objective lens 3 moves around the peak position z0.

(4-2) Detection of Peak Position

Figure 6:
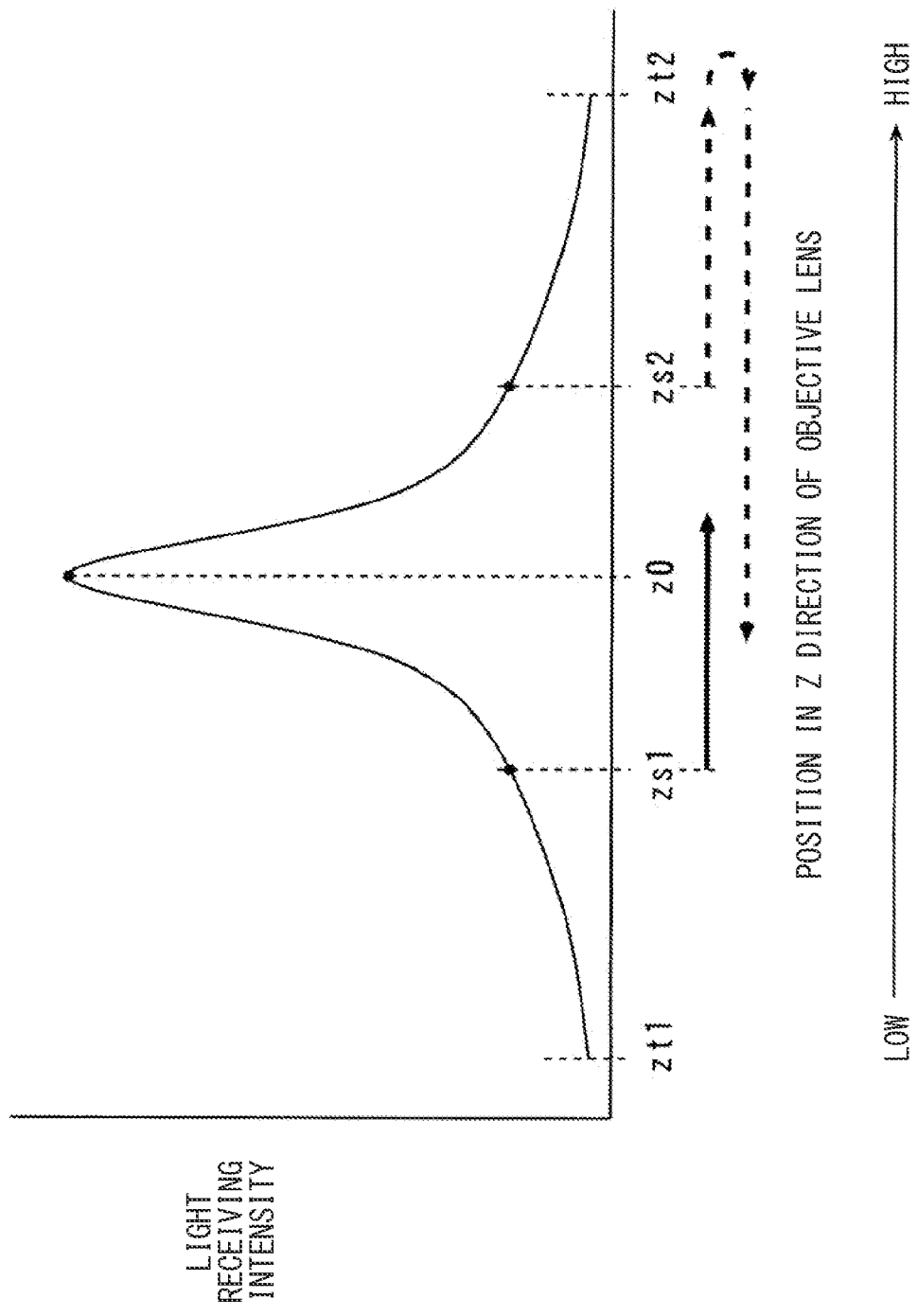
FIG. 6 is a view for describing the concept of the detection method of the peak position.

FIG. 6 is a view for describing the concept of the detection method of the peak position z0. FIG. 6 shows a relationship of the position in the Z direction of the objective lens 3 and the light receiving intensity of the light receiving element 30 in one pixel. In FIG. 6, the vertical axis shows the light receiving intensity of the light receiving element 30, and the horizontal axis shows the position in the Z direction of the objective lens 3. On the horizontal axis of FIG. 6, the position in the Z direction of the objective lens 3 becomes higher from the left towards the right.

As described above, the light receiving intensity of the light receiving element 30 has a peak value when the focus position of the objective lens 3 is on the surface of the observing object S, and greatly changes when the objective lens 3 moves around the peak position z0.

The light receiving intensity of the light receiving element 30 is acquired while gradually moving the objective lens 3, for example, in the upward direction from the current position zs1 (position lower than peak position z0) in the Z direction, as shown with a thick solid line arrow in FIG. 6.

The acquired light receiving intensity of the light receiving element 30 increases exponentially up to the peak value, and then decreases exponentially from the peak value. The switch of increase and decrease of the light receiving intensify can be detected by moving the objective lens 3 in one direction (upward direction) of the Z direction. The position of the objective lens 3 of when the light receiving intensity indicates a peak value thus can be detected as the peak position z0.

The movable range in the Z direction of the objective lens 3 is defined in advance by the magnification of the objective lens 3. The position on the lower side of the objective lens 3 permitted in advance is referred to as a lower end position zt1, and the position on the upper side of the objective lens 3 permitted in advance is referred to as an upper end position zt2.

As shown with a thick dotted line arrow in FIG. 6, the peak position z0 cannot be detected even if the objective lens 3 is moved in the upward direction if the objective lens 3 is first at a position zs2 higher than the peak position z0. In this case, the objective lens 3 is moved to the upper end position zt2, and then the objective lens 3 is moved in the opposite direction (downward direction). The peak position z0 then can be detected, similar to the above.

(4-3) Value of Pixel Data

In the above description, the method of detecting the peak position z0 based on the light receiving intensity of the light receiving element 30 has been described, but the peak position z0 is actually detected based on the value of the pixel data.

The pixel data is a digital signal corresponding to the light receiving signal output from the light receiving element 30. Thus, the value of the pixel data becomes larger as the gain of the light receiving element 30 becomes larger, and becomes smaller as the gain of the light receiving element 30 becomes smaller. The pixel data is output from the A/D converter. Therefore, the upper limit value of the pixel data is the upper limit value (hereinafter referred to as output upper limit value) of the output range of the A/D converter.

Figure 7A:
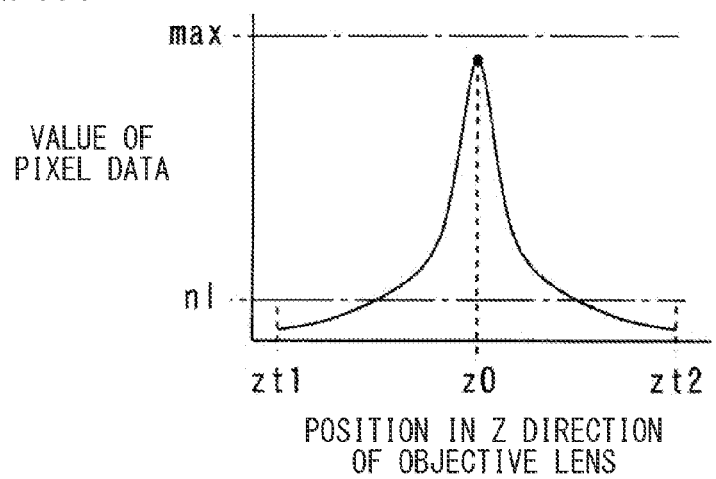
FIGS. 7A to 7C are views for describing the gain setting of the light receiving element at the time of the detection of the peak position.
Figure 7B:
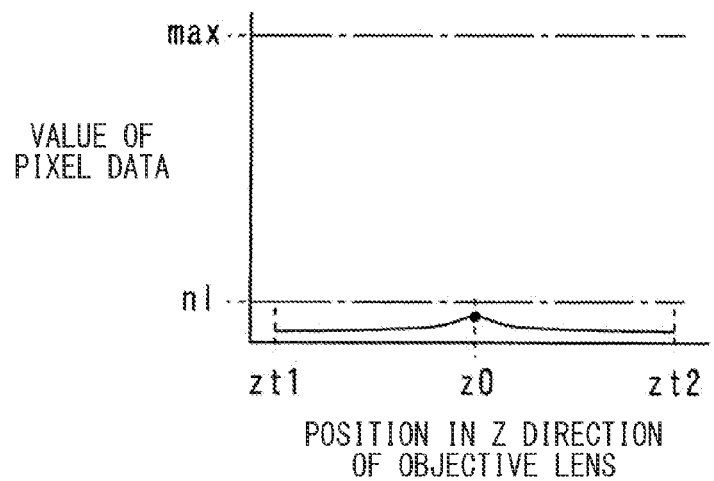
Figure 7C:
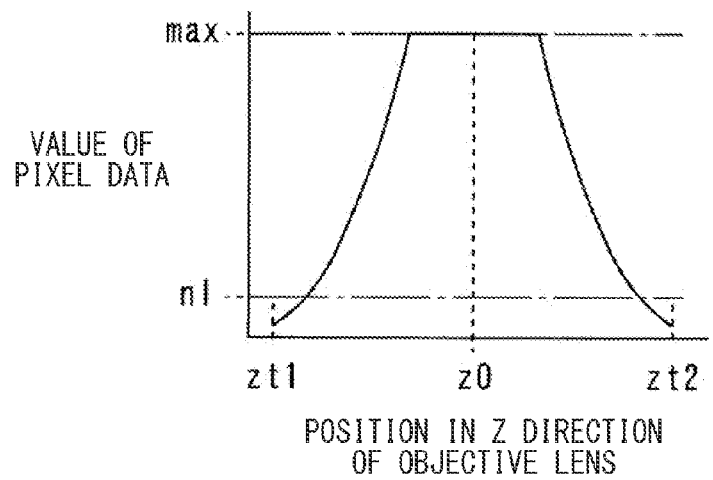

When detecting the peak position z0, the gain of the light receiving element 30 is set in the following manner. FIGS. 7A to 7C are views for describing the gain setting of the light receiving element 30 at the time of the detection of the peak position z0.

FIG. 7A shows the relationship of the position in the Z direction of the objective lens 3 and the value of the pixel data when the gain of the light receiving element 30 is appropriate. In FIG. 7A, the vertical axis indicates the value of the pixel data, and the horizontal axis indicates the position in the Z direction of the objective lens 3.

In the example of FIG. 7A, the peak value of the pixel data is smaller than the output upper limit value max and sufficiently larger than the digital value (hereinafter referred to as noise level n1) of the noise of the light receiving element 30. In this case, the pixel data does not saturate at the output upper limit value max, and the peak of the pixel data can be clearly identified from the noise of the light receiving element 30. The peak value of the pixel data and the peak position z0 thus can be easily and accurately detected.

FIG. 7B shows the relationship of the position in the Z direction of the objective lens 3 and the value of the pixel data when the gain of the light receiving element 30 is very small. In the example of FIG. 7B, the peak value of the pixel data is smaller than or equal to the noise level n1. In this case, the peak of the pixel data cannot be identified from the noise. Thus, the peak value of the pixel data and the peak position z0 cannot be accurately detected.

FIG. 7C shows the relationship of the position in the Z direction of the objective lens 3 and the value of the pixel data when the gain of the light receiving element 30 is very large. In the example of FIG. 7C, the pixel data is saturated at the output upper limit value max over a range of one part of the position in the Z direction of the objective lens 3. Thus, the peak value of the pixel data and the peak position z0 cannot be accurately detected.

The user does not recognize the light receiving intensity of the light receiving element 30 at the peak position z0 at the time point of the start of detection of the peak position z0. Thus, it is difficult to set the gain of the light receiving element 30 in advance before the start of detection of the peak position z0. In the present embodiment, the peak position z0 is searched while adjusting the gain of the light receiving element 30. The process of searching for the peak position z0 while adjusting the gain of the light receiving element 30 is hereinafter referred to as the peak position searching process.

The value of the pixel data changes also when the light quantity of the laser light emitted from the laser light source 10 or the attenuation rate of the ND filter 8 changes. Therefore, the peak position z0 may be searched while the light quantity of the laser light emitted from the laser light source 10 or the attenuation rate of the ND filter 8 is changed and set for the sensitivity parameter. Furthermore, the peak position z0 may be searched while two or more of the gain of the light receiving element 30, the light quantity of the laser light emitted from the laser light source 10 or the attenuation rate of the ND filter 8 are changed and set for the sensitivity parameter.

(4-4) Peak Position Searching Process

The peak position searching process using an evaluation value will now be described. FIGS. 8A and 8B are views for describing the peak position searching process using an evaluation value. The evaluation value is a value calculated based on the value of a plurality of pixel data corresponding to a plurality of pixels in the region defined in advance of the surface of the observing object S. In the present embodiment, the evaluation value is the sum of the values of the pixel data of a plurality of pixels (e.g., five pixels or ten pixels, etc.) in the region defined in advance. The position in the Z direction of the objective lens 3 when the evaluation value indicates a peak value is referred to as an evaluation peak position Ez0. A multiplication value of the output upper limit value max of the A/D converter and the number of the plurality of pixels for calculating the evaluation value is referred to as an output upper limit value Emax.

FIG. 8A shows a relationship of the position in the Z direction of the objective lens 3 and the evaluation value. In FIG. 8A, the vertical axis indicates the evaluation value and the horizontal axis indicates the position in the Z direction of the objective lens 3. On the horizontal axis of FIG. 8A, the position in the Z direction of the objective lens 3 becomes higher from the left towards the right.

At the start of the peak position searching process, the gain of the light receiving element 30 is set so that the calculated evaluation value is smaller than the output upper limit value Emax and sufficiently larger than the multiplication value En1 of the noise level n1 and the number of plurality of pixels for calculating the evaluation value. The gain of the light receiving element 30 is set so that the calculated evaluation value becomes ½, for example, of the output upper limit value Emax.

Thereafter, as shown with a thick solid line arrow in FIG. 8A, the pixel data corresponding to the plurality of pixels for calculating the evaluation value at the set gain while gradually moving the objective lens 3 in the upward direction from the current position zs1 (position lower than evaluation peak position Ez0) in the Z direction are acquired, and the evaluation value is calculated.

In this case, the evaluation value increases exponentially while the objective lens 3 reaches the evaluation peak position Ez0. In the peak position searching process, the gain is reduced by a constant amount every time the evaluation value reaches the output upper limit value Emax.

The evaluation value that increases exponentially is prevented from saturating at the output upper limit value Emax while the objective lens 3 moves from the position zs1 in the Z direction to the evaluation peak position Ez0. As a result, the gain of the light receiving element 30 is ultimately set to a suitably value in the vicinity of the evaluation peak position Ez0.

The evaluation value becomes small when the gain of the light receiving element 30 reduces. Thus, in the peak position searching process, the calculated evaluation value is corrected based on the number of reductions of the gain of the light receiving element 30.

The evaluation value becomes small when the gain of the light receiving element 30 reduces. Thus, in the peak position searching process, the calculated evaluation value is corrected based on the number of reductions of the gain of the light receiving element 30.

In this case, the evaluation value at the time of the reduction of the gain is corrected to the value of greater than or equal to the output upper limit value Emax by carrying out a predetermined calculation on the evaluation value at the time point of the reduction of the gain of the light receiving element 30. With the same calculation carried out on a plurality of evaluation values from after the time point of the reduction of the gain to before the time point of the next reduction of the gain, these evaluation values can be corrected. For instance, the output upper limit value max is added to the evaluation value at the time point of the reduction of the gain of the light receiving element 30, and the same output upper limit value max is added to each of the plurality of evaluation values from after the time point of the reduction of the gain to before the time point of the next reduction of the gain. Alternatively, a ratio of the gain after the reduction and the gain before the reduction is multiplied to the evaluation value at the time point of the reduction of the gain of the light receiving element 30, and the same ratio is multiplied to each of the plurality of evaluation values from after the time point of the reduction of the gain to before the time point of the next reduction of the gain.

In the present embodiment, the multiplication value of the number of reductions of the gain of the light receiving element 30 after the start of the peak position searching process and the output upper limit value max is added to the calculated evaluation value. The evaluation value after the correction and the light receiving intensity of the light receiving element 30 thus can be approximately corresponded over the entire range in the Z direction of the objective lens 3. Alternatively, the ratio of the gain of the light receiving element 30 at the start of the peak position searching process and the gain at the time of the acquisition of the pixel data used in the calculation of each evaluation value may be multiplied to the calculated evaluation value. The evaluation value after the correction and the light receiving intensity of the light receiving element 30 thus can be accurately corresponded over the entire range in the Z direction of the objective lens 3.

FIG. 8B shows a relationship of the position in the Z direction of the objective lens 3 and the corrected evaluation value. In FIG. 8B, the vertical axis indicates the corrected evaluation value and the horizontal axis indicates the position in the Z direction of the objective lens 3. On the horizontal axis of FIG. 8B, the position in the Z direction of the objective lens 3 becomes higher from the left towards the right.

As shown in FIG. 8B, the evaluation value after the correction increase exponentially to the peak value and then decreases exponentially from the peak value, similar to the light receiving intensity of the light receiving element 30. Thus, by moving the objective lens 3 in one direction (upward direction) of the Z direction, the switching of the increase and decrease of the evaluation value of after the correction is detected, and the position of the objective lens 3 when the evaluation value indicates a peak value can be detected as the evaluation peak position Ez0 when the reduction of the evaluation value of after the correction by the value pi2 defined in advance is detected after the switching of the increase and decrease of the evaluation value of after the correction, and the increase of the value of the pixel data of after the correction by the value pi1 defined in advance is detected before the switching of the increase and decrease of the evaluation value of after the correction.

The value of the pixel data changes by the influence of noise of the light receiving element 30. The values pi1, pi2 are set to values greater than the multiplication value En1 of the noise level n1 and the number of plurality of pixels for calculating the evaluation value, for example. Therefore, the evaluation peak position Ez0 is prevented from being mistakenly detected even if the evaluation value of after the correction changes by the influence of noise of the light receiving element 30. The values pi1, pi2 correspond to first and second identification values, respectively. The values pi1, pi2 may be the same values or may be different values from each other.

As described above, when the autofocus process is executed, the evaluation peak position Ez0 is searched while adjusting the gain of the light receiving element 30 by the peak position searching process. In this case, the evaluation value does not saturate at the output upper limit value Emax. The evaluation value does not become smaller than the multiplication value En1 of the noise level n1 and the number of plurality of pixels for calculating the evaluation value. Thus, the position of the peak in the change in the evaluation value due to the movement of the objective lens 3 is detected, and the evaluation peak position Ez0 is automatically detected. Thereafter, the objective lens 3 is moved to the detected evaluation peak position Ez0 in the autofocus process.

Therefore, the gain of the light receiving element 30 is automatically set and the evaluation peak position Ez0 is automatically detected. The user thus can observe the confocal image of the observing object S with the focus of the objective lens 3 focused in the desired region without performing the troublesome task of focusing.

In the above description, an example of reducing the gain by a constant amount every time the evaluation value reaches the output upper limit value Emax has been described, but the gain of the light receiving element 30 may be increased by a constant amount if the evaluation value reached the multiplication value En1. In this case, the evaluation value at the time point of increase of the gain is corrected to the value of smaller than or equal to the multiplication value En1 by performing a predetermined calculation on the evaluation value at the time point of the increase of the gain of the light receiving element 30. With the same calculation carried out on a plurality of evaluation values from after the time point of the increase of the gain to before the time point of the next increase of the gain, these evaluation values can be corrected. For instance, the output upper limit value max is subtracted from the evaluation value at the time point of the increase of the gain of the light receiving element 30, and the same output upper limit value max is subtracted from each of the plurality of evaluation values from after the time point of the increase of the gain to before the time point of the next increase of the gain. Alternatively, a ratio of the gain after the increase and the gain before the increase is multiplied to the evaluation value at the time point of the increase of the gain of the light receiving element 30, and the same ratio is multiplied to each of the plurality of evaluation values from after the time point of the increase of the gain to before the time point of the next increase of the gain. The evaluation value of after the correction and the light receiving intensity of the light receiving element 30 can be corresponded over the entire range in the Z direction of the objective lens 3.

(5) Details of Upper and Lower Limit Automatic Setting Process

FIG. 9 is a view for describing a relationship of the position in the Z direction of the objective lens 3 and the value of the valid pixel data for one pixel. In FIG. 9, the vertical axis indicates the value of the pixel data, and the horizontal axis indicates the position in the Z direction of the objective lens 3. On the horizontal axis of FIG. 9, the position in the Z direction of the objective lens 3 becomes higher from the left towards the right.

The value of the pixel data corresponding to the light receiving intensity of the light receiving element 30 cannot be obtained if the value of the pixel data saturates at the output upper limit value max. If the value of the pixel data is smaller than or equal to the noise level n1, the peak of the pixel data cannot be clearly identified from the noise of the light receiving element 30. The value of the pixel data smaller than the output upper limit value max and greater than the noise level n1 is hereinafter referred to as the value of the valid pixel data.

In FIG. 9, the range of the values of the valid pixel data is shown with an arrow HL. In this case, when an arbitrary first gain is set to the light receiving element 30, as shown with a curve l1, the value of the pixel data for one pixel is valid in a state the objective lens 3 is in a range from the position ma1 lower than the peak position z0 and the position mb1 higher than the peak position z0.

Therefore, the upper limit position and the lower limit position in the Z direction of the objective lens 3 for acquiring the value of the valid pixel data for one pixel are defined according to the output upper limit value max and the noise level n1.

As shown with a curve l2 in FIG. 9, if the second gain smaller than the first gain is set to the light receiving element 30, the value of the pixel data becomes small as a whole compared to when the first gain is set to the light receiving element 30. In this case, the value of the pixel data for one pixel is valid in a state the objective lens 3 is in a range from the position ma2 higher than the position ma1 to the position mb2 lower than the position mb1. Thus, when the gain set to the light receiving element 30 changes, the upper limit position and the lower limit position in the Z direction of the objective lens 3 at which the value of the valid pixel data can be obtained also change.

FIG. 10 is a view for describing the setting method of the upper limit position and the lower limit position in the Z direction of the objective lens 3 at the time of the generation of the height image data and the ultradeep image data.

The pixel data corresponding to all the pixels in the unit region are first acquired by carrying out the scanning in the X direction and the Y direction of the unit region with the objective lens 3 held at an arbitrary zs1 position in the Z direction. In such a state, the gain of the light receiving element 30 is increased by a constant amount if the values of all the pixel data are not greater than or equal to the defined value defined in advance.

The evaluation value is then calculated while moving the objective lens 3 in the Z direction by a constant amount, and the evaluation peak position Ez0 is searched based on the calculated evaluation value, for example, as shown with a thick solid line arrow na in FIG. 10 by the peak position searching process using the evaluation value. The evaluation value is the sum of the values of the pixel data corresponding to all the pixels of the unit region. In searching, the gain is reduced by a constant amount every time the calculated evaluation value reaches the output upper limit value Emax. The output upper limit value Emax in this case is the multiplication value of the output upper limit value max of the A/D converter 30 and the number of all the pixels in the unit region. The upper limit position UP and the lower limit position BP of the objective lens 3 thus can be searched with the detected evaluation peak position Ez0 as a reference.

The objective lens 3 is then moved to the evaluation peak position Ez0. The scanning in the X direction and the Y direction of the unit region is carried out in such state to acquire the pixel data corresponding to all the pixels in the unit region.

If the value of one of the pixel data is the output upper limit value max, the value of such pixel data is not valid. The gain of the light receiving element 30 is thus reduced by a constant amount. Thereafter, the scanning in the X direction and the Y direction of the unit region is again carried out to acquire the pixel data corresponding to all the pixels in the unit region.

The gain adjustment and the acquisition of the pixel data are repeated to determine whether or not the values of all the pixel data are smaller than or equal to the noise level n1 when the values of all the pixel data become smaller than the output upper limit value max.

If the values of all the pixel data are not smaller than or equal to the noise level n1, the objective lens 3 is moved in the upward direction by a constant amount as shown with a thick solid line arrow nb in FIG. 10.

Then, the gain adjustment, the acquisition of the pixel data, the determination operation of the pixel data, and the movement of the objective lens 3 in the upward direction are repeated. The position in the Z direction of the objective lens 3 of when the values of all the pixel data are determined to be smaller than or equal to the noise level n1 is ultimately set as the upper limit position UP.

After the setting of the upper limit position UP, the objective lens 3 is moved in the Z direction up to the position of the time point the gain of the light receiving element 30 is reduced the last. The scanning in the X direction and the Y direction of the unit region is carried out in such state to acquire the pixel data corresponding to all the pixels in the unit region.

In this case as well, the gain of the light receiving element 30 is reduced by a constant amount if the value of one of the pixel data is the output upper limit value max, similar to the above. Thereafter, the scanning in the X direction and the Y direction of the unit region is again carried out to acquire the pixel data corresponding to all the pixels in the unit region.

The gain adjustment and the acquisition of the pixel data are repeated to determine whether or not the values of all the pixel data are smaller than or equal to the noise level n1 when the values of all the pixel data become smaller than the output upper limit value max.

If the values of all the pixel data are not smaller than or equal to the noise level n1, the objective lens 3 is moved in the downward direction by a constant amount as shown with a thick solid line arrow nc in FIG. 10. Then, the gain adjustment, the acquisition of the pixel data, the determination operation of the pixel data, and the movement of the objective lens 3 in the downward direction are repeated. The position in the Z direction of the objective lens 3 of when the values of all the pixel data are determined to be smaller than or equal to the noise level n1 is ultimately set as the lower limit position BP.

If the gain of the light receiving element 30 changes, the range in the Z direction of the objective lens 3 in which the value of the valid pixel data can be obtained also changes. Thus, if the gain of the light receiving element 30 is reduced at the time of the setting of the lower limit position BP after the setting of the upper limit position UP, the objective lens 3 is moved to the position at the time point the gain of the light receiving element 30 is reduced the last, and then the upper limit position UP is again searched, as shown with a thick solid line arrow nd in FIG. 10.

In searching the upper limit position UP again, the objective lens 3 moves in the Z direction in the range substantially the same as in the first search of the upper limit position UP. Thus, the gain of the light receiving element 30 is barely reduced. The upper limit position UP is thus reset with the light receiving element 30 adjusted to the gain substantially the same as the gain at the time of the setting of the lower limit position BP.

As described above, when the upper and lower automatic setting process is executed, the evaluation peak position Ez0 of the objective lens 3 is searched while adjusting the gain of the light receiving element 30 by the peak position searching process. In this case, the evaluation value does not saturate at the output upper limit value Emax. Furthermore, the evaluation value does not become smaller than the multiplication value En1 of the noise level n1 and the number of all the pixels in the unit region. The position of the peak in the change of the evaluation value due to the movement of the objective lens 3 is thereby detected, and the evaluation peak position Ez0 is automatically detected.

Subsequently, the objective lens 3 is moved to the detected evaluation peak position Ez0, and the search for the upper limit position UP and the lower limit position BP is carried out. The upper limit position UP and the lower limit position BP of the objective lens 3 at the time of the generation of the height image data and the ultradeep image data are thereby set.

In this case, the objective lens 3 is moved within the range of the upper limit position UP and the lower limit position BP, so that the peak position z0 can be detected for each pixel in the unit region. Therefore, the focus of the objective lens 3 can be focused on the surface of the observing object S for each pixel in the unit region. The gain of the light receiving element 30 at the time of the generation of the height image data and the ultradeep image data is also set to the most suitable value. From such results, the user can observe the stable height image and ultradeep image without carrying out the troublesome setting task of the upper limit position UP and the lower limit position BP.

Furthermore, since the objective lens 3 is not moved beyond the upper limit position UP and the lower limit position BP, the wasteful scanning of the laser light is reduced and the generation time of the height image data and the ultradeep image data is reduced.

(6) Autofocus Process Flow

Figure 11:
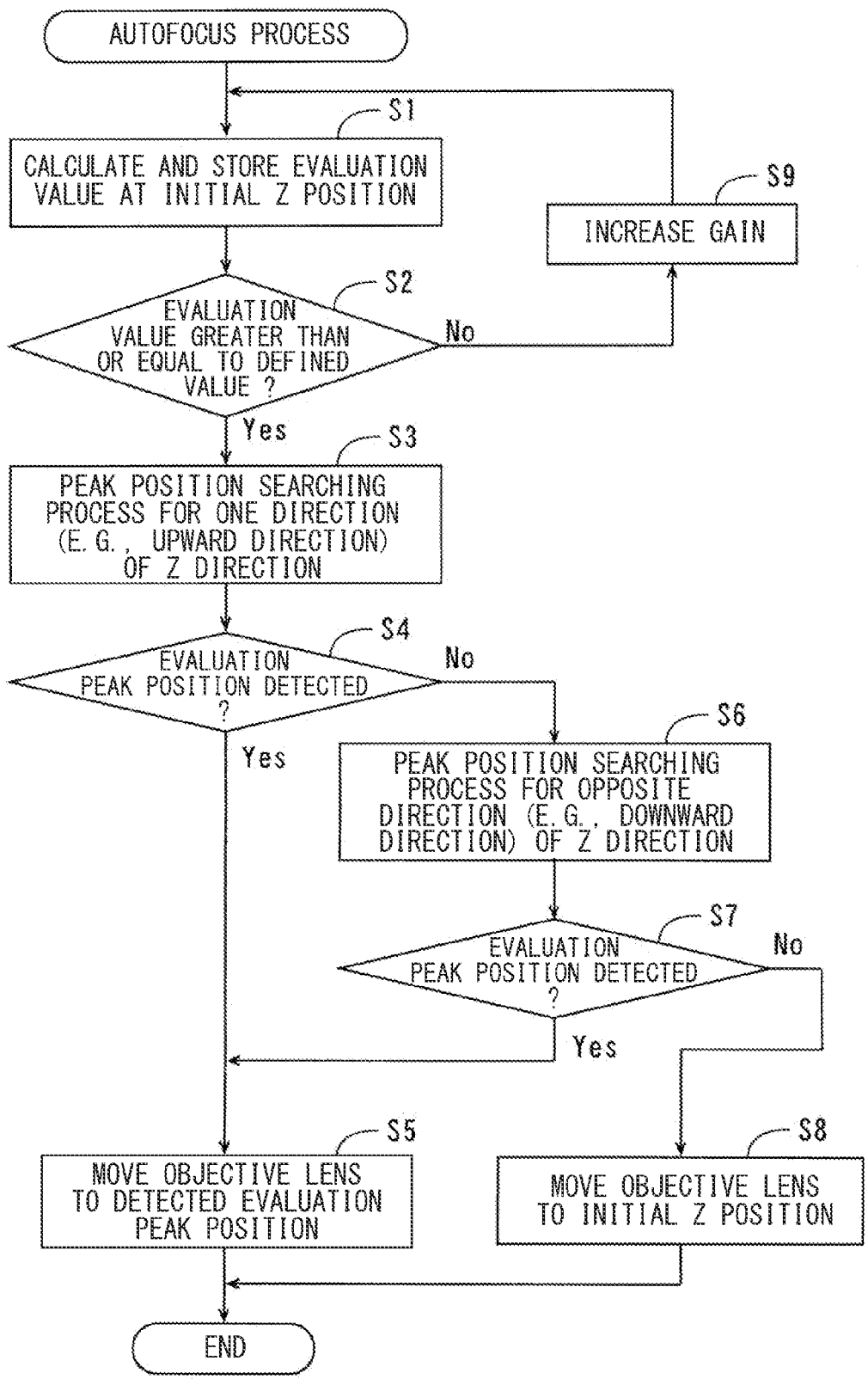
FIG. 11 is a flowchart of an autofocus process.

FIG. 11 is a flowchart of the autofocus process. As described above, the autofocus process starts when the user operates the autofocus button 423 of the condition setting region 420 of FIG. 4. The CPU 210 of FIG. 1 executes a focus position detection programs stored in the storage device 240 to perform the autofocus process. In the following description, the position of the objective lens 3 in the Z direction is referred to as the Z position.

As shown in FIG. 11, the CPU 210 first calculates the evaluation value by acquiring the value of the pixel data corresponding to a plurality of pixels at the initial Z position of the objective lens 3, and stores the calculated evaluation value in the work memory 230 of FIG. 1 (step S1). The pixel data corresponding to a plurality of pixels (e.g., five pixels or ten pixels etc.) at the middle displayed in the image display region 410 of FIG. 4 are used for the pixel data corresponding to the plurality of pixels for calculating the evaluation value.

Thereafter, the CPU 210 determines whether or not the stored evaluation value is greater than or equal to the defined value defined in advance (step S2). The defined value is set so as to be smaller than the value obtained by multiplying the number of pixels for calculating the evaluation value to the output upper limit value max. The defined value is also set so as to be greater than the value obtained by multiplying the number of pixels for calculating the evaluation value to the added value of the first or second identification value used in steps S22, S23 of the peak position searching process, to be described later and the noise level n1.

If the evaluation value is greater than or equal to the defined value, the CPU 210 carries out the peak position searching process of FIG. 12 to FIG. 14, to be described later, for one direction (e.g., upward direction) of the Z direction (step S3).

The CPU 210 then determines whether or not the evaluation peak position Ez0 is detected in step S3 (step S4). If the evaluation peak position Ez0 is detected, the CPU 210 moves the objective lens 3 to the detected evaluation peak position Ez0 (step S5) and terminates the autofocus process.

If the stored evaluation value is smaller than the defined value in step S2, the CPU 210 increases the gain of the light receiving element 30 by a constant amount (step S9) and returns to the process of step S1.

If the evaluation peak position Ez0 is not detected in step S4, the CPU 210 performs the peak position searching process of FIG. 12 to FIG. 14, to be described later, for the opposite direction (e.g., downward direction) of the Z direction.

The CPU 210 determines whether or not the evaluation peak position Ez0 is detected in step S6 (step S7). If the evaluation peak position Ez0 is detected, the CPU 210 moves the objective lens 3 to the detected evaluation peak position Ez0 (step S5) and terminates the autofocus process.

If the evaluation peak position Ez0 is not detected in step S7, the CPU 210 moves the objective lens 3 to the initial Z position (step S8), and terminates the autofocus process. In this case, the CPU 210 may make a display notifying that the autofocus process is not normally carried out on the display unit 400.

(7) Peak Position Searching Process Flow

Figure 12:
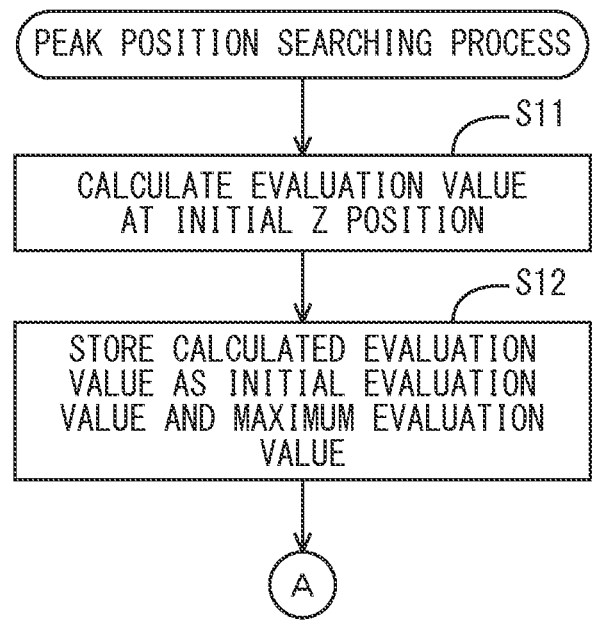
FIG. 12 is a flowchart of a peak position searching process.
Figure 13:
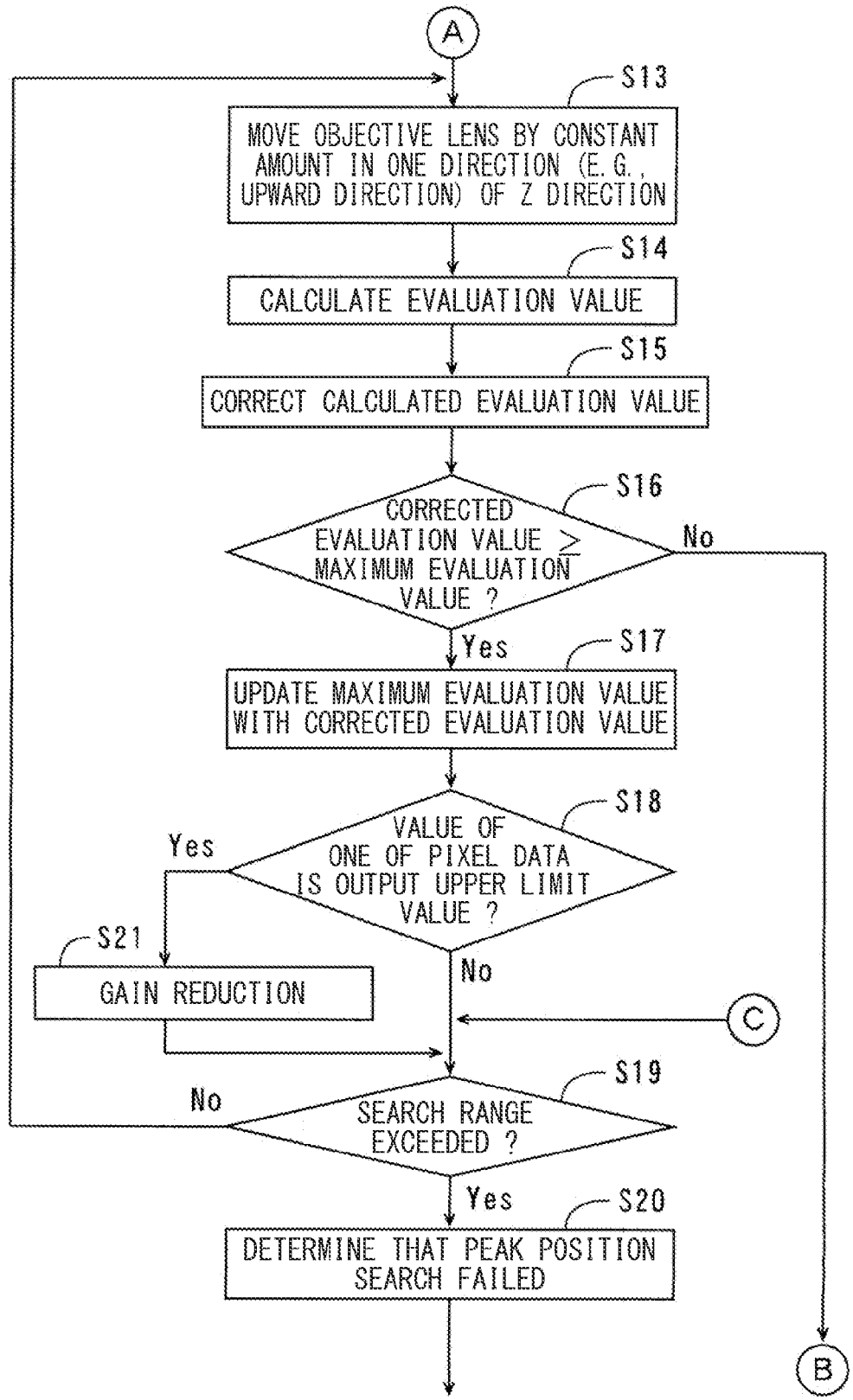
FIG. 13 is a flowchart of the peak position searching process.
Figure 14:
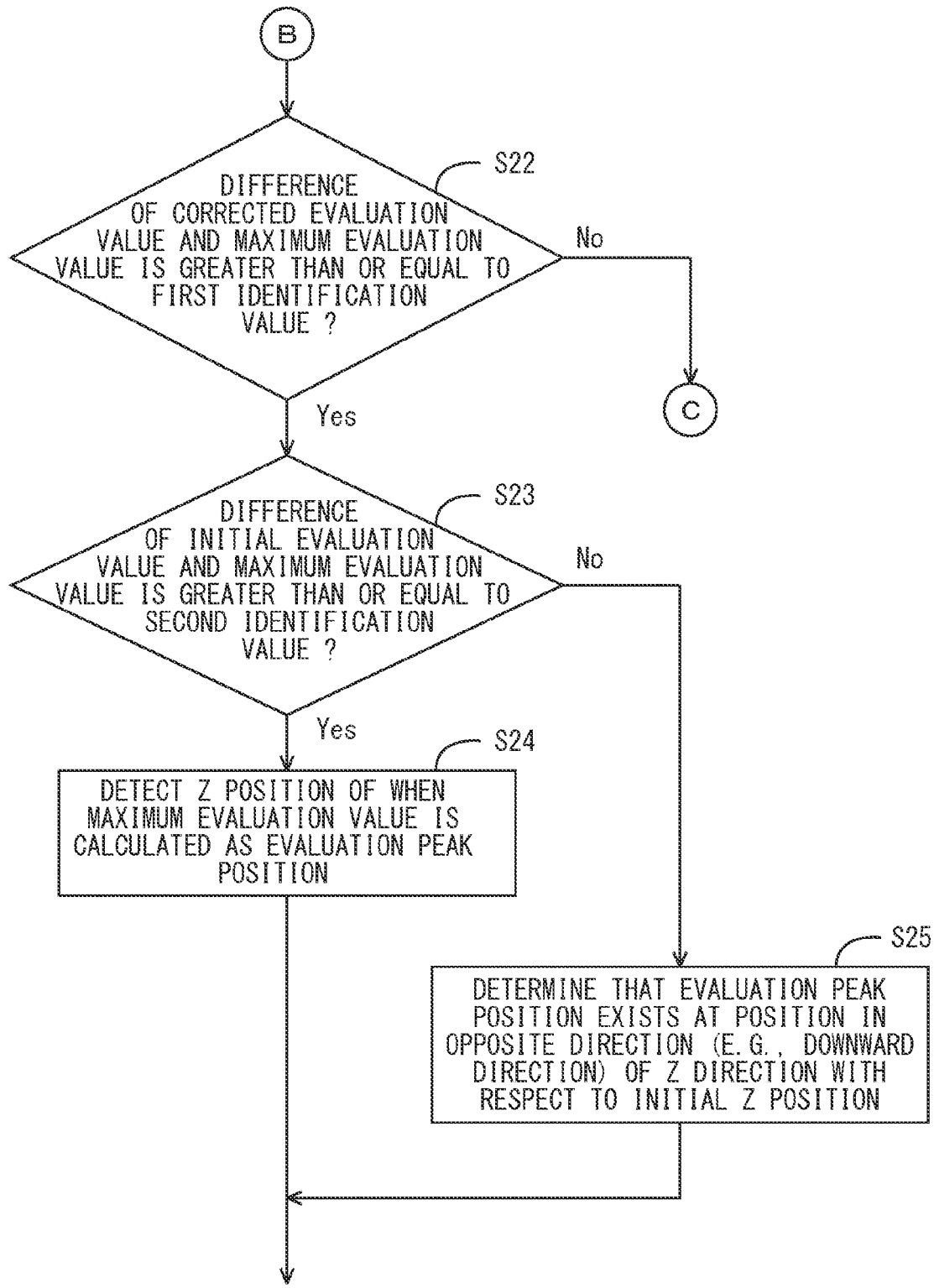
FIG. 14 is a flowchart of the peak position searching process.

FIG. 12 to FIG. 14 are flowcharts of the peak position searching process. The peak position searching process configures one part of the autofocus process and the upper and lower limit automatic setting process.

The peak position searching process starts at the time of the processes of steps S3, S6 of the autofocus process. The peak position searching process also starts at the time of the processes of the steps S32, S41, to be described later, of the upper and lower limit automatic setting process to be described later.

As shown in FIG. 12, the CPU 210 first calculates the evaluation value by acquiring the value of the pixel data corresponding to a plurality of pixels at the initial Z position of the objective lens 3 (step S11). The CPU 210 then stores the calculated evaluation value in the work memory 230 of FIG. 1 as the initial evaluation value and the maximum evaluation value (step S12).

As described above, in the peak position searching process during the autofocus process, the pixel data corresponding to a plurality of pixels (e.g., five pixels or ten pixels etc.) at the middle displayed in the image display region 410 are used for the pixel data corresponding to the plurality of pixels for calculating the evaluation value. In the peak position searching process during the upper and lower limit automatic setting process described later, on the other hand, the pixel data corresponding to all the pixels in the unit region are used for the pixel data corresponding to the plurality of pixels for calculating the evaluation value.

Thereafter, the CPU 210 moves the objective lens 3 by a constant amount in one direction (e.g., upward direction) of the Z direction (step S13) and again acquires the values of the pixel data corresponding to the plurality of pixels at the Z position of the objective lens 3 after the movement to calculate the evaluation value (step S14).

The CPU 210 then corrects the calculated evaluation value (step S15). This correction is made by adding the evaluation value calculated in step S14 to the multiplication value of the number of reductions of the gain of the light receiving element 30 in step S21, to be described later, and the output upper limit value Emax.

Thereafter, the CPU 210 determines whether or not the corrected evaluation value is greater than or equal to the maximum evaluation value stored in the work memory 230 (step S16). Whether or not the switch of the increase and decrease of the light receiving intensity of the light receiving element 30 is made then can be determined.

If the corrected evaluation value is greater than or equal to the maximum evaluation value (when increase and decrease of the light receiving intensity of the light receiving element 30 is not switched), the CPU 210 updates the maximum evaluation value stored in the work memory 230 with the corrected evaluation value (step S17).

The CPU 210 determines whether or not one of the values of the plurality of pixel data acquired when calculating the evaluation value in step S14 is the output upper limit value max (step S18).

If the values of all the pixel data are not the output upper limit value max, the CPU 210 determines whether or not the Z position of the objective lens 3 is beyond the search range (step S19). The search range referred to here is the range movable in the Z direction of the objective lens 3 that is defined in advance by the magnification of the objective lens 3, and corresponds to the range from the lower end position zt1 to the upper end position zt2 of FIG. 6.

If the Z position of the objective lens 3 is beyond the search range, the CPU 210 determines that the peak position searching process failed (step S20). If the Z position of the objective lens is not beyond the search range, the CPU 210 returns to the process of step S13.

If one of the values of the plurality of pixel data is the output upper limit value max in step S18, the CPU 210 reduces the gain of the light receiving element 30 by a constant amount (step S21), and proceeds to the process of step S19.

If the corrected evaluation value is smaller than the stored maximum evaluation value in step S16 (when increase and decrease of the light receiving intensity of the light receiving element 30 is switched), the CPU 210 determines whether or not the difference of the corrected evaluation value and the maximum evaluation value is greater than or equal to a first identification value defined in advance (step S22). The first identification value corresponds to the value pi2 of FIG. 8. The first identification value is set to be greater than the value obtained by multiplying the number of pixels for calculating the evaluation value to the value of the noise level n1.

If the difference of the corrected evaluation value and the maximum evaluation value is greater than or equal to the first identification value, the CPU 210 determines whether or not the difference of the initial evaluation value and the maximum evaluation value stored in the work memory 230 is greater than or equal to a second identification value defined in advance (step S22). The second identification value corresponds to the value pi1 of FIG. 8. The second identification value is also set to be greater than the value obtained by multiplying the number of pixels for calculating the evaluation value to the value of the noise level n1, similar to the first identification value. The first and second identification values may be the same value or may be different values from each other.

If the difference of the initial evaluation value and the maximum evaluation value is greater than or equal to the second identification value, the CPU 210 detects the Z position of the objective lens 3 of when the maximum evaluation value is calculated as the evaluation peak position Ez0 (step S24). As described above, the first and second identification values are set to be greater than the value obtained by multiplying the number of pixels for calculating the evaluation value to the value of the noise level n1. The evaluation peak position Ez0 is thus prevented from being mistakenly detected even when the evaluation value changes by the influence of noise of the light receiving element 30.

If the difference of the corrected evaluation value and the maximum evaluation value is smaller than the first identification value in step S22, the CPU 210 proceeds to the process of step S19.

If the difference of the initial evaluation value and the maximum evaluation value is smaller than the second identification value in step S23, the CPU 210 determines that the evaluation peak position Ez0 exists at the position in the opposite direction (e.g., downward direction) of the Z direction with respect to the initial Z position of the objective lens 3 (step S25).

Thus, in the steps S4, S7 of the autofocus process and the steps S33, S42 of the upper and lower limit automatic setting process, to be described later, determination is made that the evaluation peak position Ez0 is detected by carrying out the process of step S24 of the peak position searching process. Determination is made that the evaluation peak position Ez0 is not detected by carrying out the process of steps S20, S25 of the peak position searching process.

(8) Upper and Lower Limit Automatic Setting Process Flow

Figure 15:
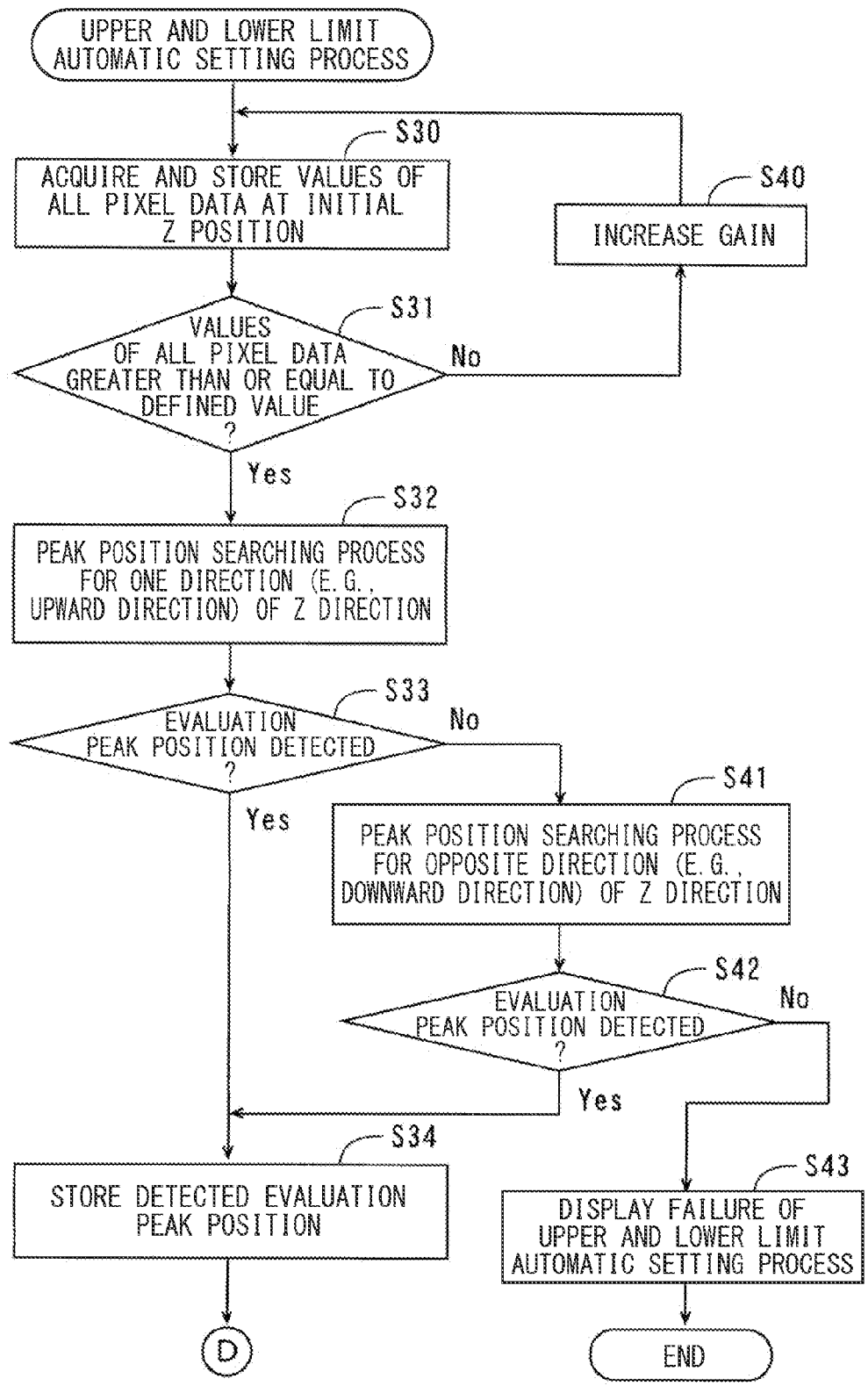
FIG. 15 is a flowchart of an upper and lower automatic setting process.
Figure 16:
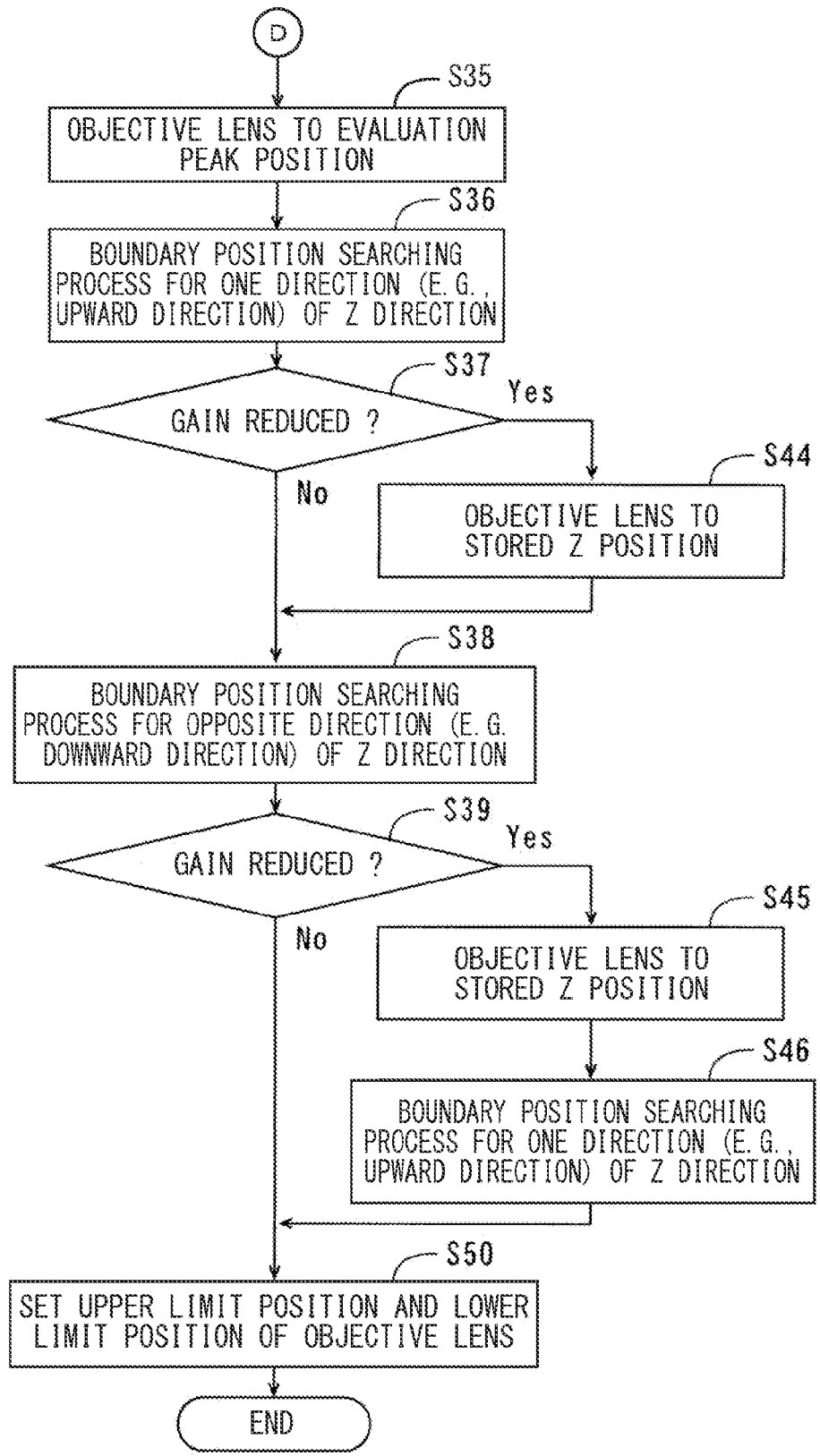
FIG. 16 is a flowchart of the upper and lower automatic setting process.

FIG. 15 and FIG. 16 are flowcharts of the upper and lower limit automatic setting process. As described above, the upper and lower limit automatic setting process starts when the user operates the upper and lower limit automatic setting button 424 of the condition setting region 420 of FIG. 4. The CPU 210 of FIG. 1 executes the focus position detection program stored in the storage device 240 to carry out the upper and lower automatic setting process.

As shown in FIG. 15, the CPU 210 first acquires the value of the pixel data corresponding to all the pixels in the unit region at the initial Z position of the objective lens 3, and stores the acquired value of the pixel data in the work memory 230 of FIG. 1 (step S30).

The CPU 210 then determines whether or not the values of all the stored pixel data are greater than or equal to the defined value defined in advance (step S31). The defined value is set so as to be smaller than the output upper limit value max. The defined value is also set so as to be greater than the added value of the first or second identification value used in steps S22, S23 of the peak position searching process and the noise level n1.

If the values of all the pixel data are greater than or equal to the defined value, the CPU 210 carries out the peak position searching process of FIG. 12 to FIG. 14 for one direction (e.g., upward direction) of the Z direction (step S32).

The CPU 210 then determines whether or not the evaluation peak position Ez0 is detected in step S32 (step S33). If the evaluation peak position Ez0 is detected, the CPU 210 stores the detected evaluation peak position Ez0 in the work memory 230 (step S34).

The CPU 210 then moves the objective lens 3 to the evaluation peak position Ez0 (step S35). The CPU 210 carries out a boundary position searching process of FIG. 17, to be described later, for one direction (e.g., upward direction) of the Z direction (step S36). The boundary position searching process is a process of searching for the upper limit position UP or the lower limit position BP while carrying out the gain adjustment of the light receiving element 30. The details of the boundary position searching process will be described later.

Figure 17:
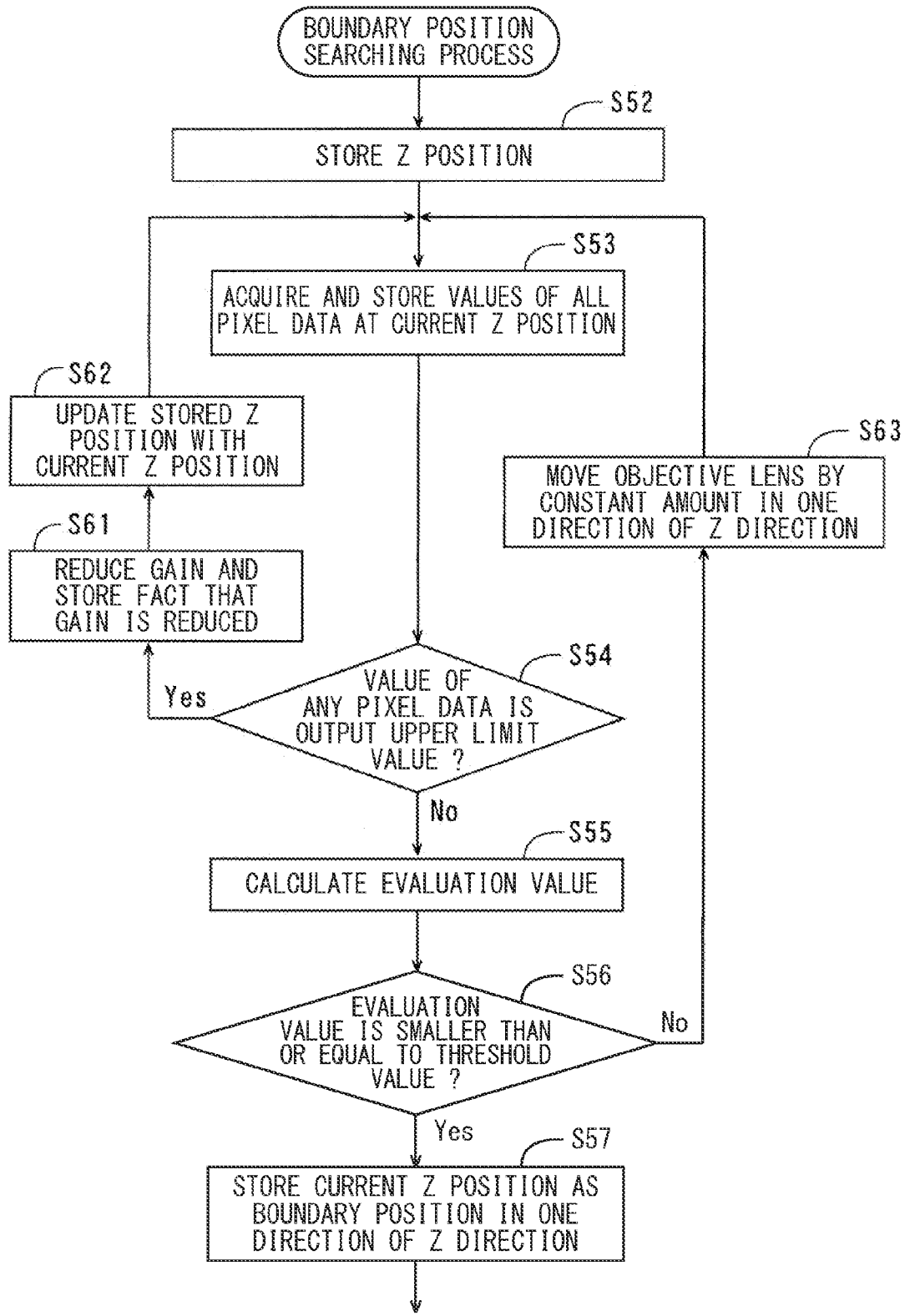
FIG. 17 is a flowchart of a boundary position searching process.

In the boundary position searching process, the gain of the light receiving element 30 is sometimes reduced by a constant amount in step S61 of FIG. 17. The CPU 210 determines whether or not the gain of the light receiving element 30 is reduced in the boundary position searching process of step S36 (step S37). If the gain of the light receiving element 30 is not reduced, the CPU 210 carries out the boundary position searching process of FIG. 17 for the opposite direction (e.g., downward direction) of the Z direction (step S38).

The CPU 210 then determines whether or not the gain of the light receiving element 30 is reduced in the boundary position searching process of step S38 (step S39), similarly to step S37.

In the boundary position searching process to be described later, the boundary position of the Z position of the objective lens 3 is stored in the work memory 230 in the process of the final step S57. If the gain of the light receiving element 30 is not reduced in step S39, the CPU 210 sets the upper limit position UP of the objective lens 3 based on the boundary position stored by the boundary position searching process in step S36, and sets the lower limit position BP of the objective lens 3 based on the boundary position stored by the boundary position searching process in step S38 (step S50). The upper and lower limit automatic setting process is thereby terminated.

If the evaluation peak position Ez0 is not detected in step S33, the CPU 210 carries out the peak position searching process of FIG. 12 to FIG. 14 for the opposite direction (e.g., downward direction) of the Z direction (step S41).

The CPU 210 then determines whether or not the evaluation peak position Ez0 is detected in step S41 (step S42). If the evaluation peak position Ez0 is detected, the CPU 210 proceeds to the process of step S34. If the evaluation peak position Ez0 is not detected, the CPU 210 makes a display notifying that the upper and lower limit automatic setting failed on the display unit 400 (step S43), and terminates the upper and lower automatic setting process.

If the gain of the light receiving element 30 is reduced in step S37, the CPU 210 moves the objective lens 3 to the Z position of the objective lens 3 stored the last in step S52 or step S62 of the boundary position searching process, to be descried later, (step S44).

Similarly if the gain of the light receiving element 30 is reduced in step S39, the CPU 210 moves the objective lens 3 to the Z position of the objective lens 3 stored the last in step S52 or step S62 of the boundary position searching process, to be descried later, (step S45). Thereafter, the CPU 210 again carries out the boundary position searching process of FIG. 17, to be described later, for one direction (e.g., upward direction) of the Z direction (step S46).

The CPU 210 then proceeds to the process of step S50. In step S50, if the process of step S46 is carried out, the CPU 210 resets the upper limit position UP of the objective lens 3 based on the boundary position stored by the boundary position searching process in step S46, and sets the lower limit position BP of the objective lens 3 based on the boundary position stored by the boundary position searching process in step S38. The upper limit position UP and the lower limit position BP of the objective lens 3 are set with the gain of the light receiving element 30 adjusted to an optimum value.

(9) Boundary Position Searching Process Flow

FIG. 17 is a flowchart of the boundary position searching process. As described above, the boundary position searching process starts at the time of the processes of steps S36, S38, S46 of the upper and lower automatic setting process.

As shown in FIG. 17, the CPU 210 stores the current Z position of the objective lens 3 in the work memory 230 (step S52).

The CPU 210 then acquires the value of the pixel data corresponding to all the pixels in the unit region at the current Z position of the objective lens 3, and stores the acquired value of the pixel data in the work memory 230 of FIG. 1 (step S53).

The CPU 210 determines whether or not one of the values of the plurality of stored pixel data is the output upper limit value max (step S54). If the values of all the pixel data are not the output upper limit value max, the CPU 210 calculates the evaluation value by acquiring the value of the pixel data corresponding to all the pixels in the unit region (step S55), and determines whether or not the calculated evaluation value is smaller than or equal to a threshold value defined in advance (step S56). The threshold value may be set to a value equal to the multiplication value of the noise level n1 and the number of plurality of pixels (total number of pixels in the unit region in the present example) for calculating the evaluation value, or may be set to a value greater than the multiplication value. Furthermore, the threshold value may be set in plurals so as to correspond to each of a plurality of gains of the light receiving element 30 different from each other. In this case, the CPU 210 determines whether or not the calculated evaluation value is smaller than or equal to the threshold value corresponding to the currently set gain of the light receiving element 30 in step S56.

If the calculated evaluation value is smaller than or equal to the threshold value, the CPU 210 stores the current Z position of the objective lens 3 in the work memory 230 as the boundary position (e.g., upper limit position UP or lower limit position BP) in one direction of the Z direction (step S57).

If the value of one of the pixel data is the output upper limit value max in step S54, the CPU 210 reduces the gain of the light receiving element 30 by a constant amount and stores the fact that the gain is reduced in the work memory 230 (step S61). Thus, in the upper and lower limit automatic setting process, whether or not the fact that the gain is reduced is stored in the work memory 230 is determined in steps S37, S39 to determine whether or not the gain of the light receiving element 30 is reduced.

The CPU 210 then updates the Z position of the objective lens 3 stored in the work memory 230 in step S52 with the current Z position of the objective lens 3 (step S62), and returns to the process of step S53.

If the calculated evaluation value is greater than the threshold value in step S56, the CPU 210 moves the objective lens 3 by a constant amount in one direction of the Z direction (step S63), and returns to the process of step S53.

(10) Other Embodiments (10-1) In the description made above, the autofocus process, the peak position searching process, the upper and lower limit automatic setting process, and the boundary position searching process are executed in the confocal microscope system 500.

Not limited thereto, the autofocus process, the peak position searching process, the upper and lower limit automatic setting process, and the boundary position searching process can be applied to the microscope system for observing the state of the surface of the observing object based on a digital signal acquired in correspondence with the intensity of light projected on the observing object and guided to the light receiving element 30. Such microscope system includes a microscope system using optical interferometry, and the like.

(10-2) In the embodiment described above, the relative position in the Z direction of the observing target S with respect to the objective lens 3 changes when the objective lens 3 is moved in the Z direction, but this is not the sole case. The relative position in the Z direction of the observing target S with respect to the objective lens 3 may be changed by moving the stage 60 in the Z direction.

(10-3) In the embodiment described above, the laser light is scanned in the X direction and the Y direction on the observing target S by controlling the X-Y scan optical system 20, but this is not the sole case. The laser light may be scanned in the X direction and the Y direction on the observing target S by moving the stage 60.

A line light (e.g. elongate light extending in the X direction) may be used as the laser light. In this case, a Y-scan optical system that does not perform the scanning in the X direction is used instead of the X-Y scan optical system 20. Furthermore, a line CCD camera or the like including a plurality of light receiving elements arrayed in a direction corresponding to the X-direction is used instead of the light receiving element 30.

The size of the light receiving surface in the direction corresponding to the Y direction of each light receiving element of the line CCD camera is generally a few dozen μm. In this case, the light receiving surface of the line CCD camera is arranged on the focus position of the lens 2. When the surface of the observing target S is at the focus position of the objective lens 3, the line light reflected by the observing target S is collected on the light receiving surface of the line CCD camera. Most of the line light reflected by the observing target S thus enters the light receiving surface of the line CCD camera.

When the observing target S is at a position deviated from the focus position of the objective lens 3, the line light reflected by the observing target S is collected at a position in front or back of the light receiving surface of the line CCD camera. Only one part of the line light reflected by the observing target S thus enters the light receiving surface of the line CCD camera. Therefore, the pin hole member 7 does not need to be arranged in front of the line CCD camera.

(10-4) In the embodiment described above, the CPU 210 of the PC 200 may have the function of the control unit 300. In this case, the control unit 300 may not be arranged.

(10-5) In the peak position searching process, the CPU 210 may calculate the evaluation value and store the calculated evaluation value and the gain of the light receiving element 30 at the time of the calculation in the work memory 230 every time the objective lens 3 is moved by a constant amount in the Z direction until the Z position of the objective lens 3 exceeds the search range. In this case, at the time point the Z position of the objective lens 3 exceeds the search range, for example, the CPU 210 may correct each evaluation value based on the plurality of stored evaluation values and the gain of the light receiving element 30 at the time of each calculation, and detect the maximum evaluation value based on the plurality of corrected evaluation values.

(10-6) The evaluation value may be an average value of the values of the plurality of pixel data corresponding to the plurality of pixels in the region defined in advance.

(11) Correspondence relationship of each configuring element of the Claims and each unit of the embodiment Hereinafter, a correspondence example of each configuring element of the Claims and each unit of the embodiment will be descried, but the present invention is not limited to the following example.

The observing target S serves as an observing target, the confocal microscope system 500 serves as a microscope system, the laser light source 10 serves as a light source, the light receiving element 30 serves as a light receiving element, and the lenses 1, 2, the objective lens 3, the pin hole member 7, and the ND filter 8 serve as an optical system.

The control unit 300 serves as a pixel data output unit and the control unit, the output upper limit value Emax serves as an upper limit value, the multiplication value En1 of the noise level n1 and the number of plurality of pixels for calculating the evaluation value serves as a lower limit value, and the threshold value serves as a detection limit.

Furthermore, the PC 200 serves as an image data generation unit, the display unit 400 serves as a display unit, the upper limit position UP serves as a movement limit position on one side, the lower limit position BP serves as a movement limit position on the other side, and the PC 200 serves as a processing device.

Various other elements having the configuration or the function described in the Claims may be used for each configuring element of the Claims.

The present invention can be effectively used in various microscope systems.

What is claimed is:

1. A microscope system for observing a state of a surface of an observing target, the microscope system comprising:
   a light source for emitting a light;
   a light receiving element;
   an optical system for irradiating the light emitted from the light source on the observing target while collecting the light, and guiding the light irradiated on the observing target to the light receiving element;
   a pixel data output unit for outputting pixel data corresponding to a plurality of pixels based on an output signal of the light receiving element; and
   a control unit for setting a sensitivity parameter for adjusting a value of the pixel data by controlling gain of the light receiving element, and moving a focus of the optical system relative to the surface of the observing target to a plurality of positions in an optical axis direction of the optical system; wherein the control unit calculates an evaluation value using a value of the pixel data corresponding to a predetermined number of pixels of the pixel data output from the pixel data output unit at each position of the focus of the optical system, assumes the calculated evaluation value as the evaluation value corresponding to the position if the calculated evaluation value is within a range between an upper limit value defined in advance and a lower limit value defined in advance, reduces the gain of the light receiving element so that the calculated evaluation value is within the range if the calculated evaluation value reaches the upper limit value, corrects the evaluation value calculated at each position of the focus of the optical system based on a number of reductions of the gain of the light receiving element after reducing the gain of the light receiving element according to the reduction of the gain of the light receiving element to have the corrected evaluation value as the evaluation value corresponding to each position, and detects the position of the focus of the optical system indicating a peak value in a distribution of a plurality of evaluation values corresponding to the plurality of positions of the focus of the optical system and sets the gain of the light receiving element automatically, wherein the control unit moves the focus of the optical system to the position of the focus indicating the peak value and searches an upper limit position and a lower limit position by moving the focus of the optical system in one direction of the Z direction while carrying out the gain adjustment of the light receiving element and sets the upper limit position and lower limit position with the adjusted gain of the light receiving element.

2. The microscope system according to claim 1, wherein the control unit sets the sensitivity parameter by controlling at least one of a quantity of light emitted from the light source, an attenuation amount of the light in the optical system, and a gain of the light receiving element.

3. The microscope system according to claim 1, wherein the control unit calculates the evaluation value at a plurality of positions in the optical axis direction of the optical system by moving the focus of the optical system in one direction after setting the sensitivity parameter so that the evaluation value is within a range between the upper limit value and the lower limit value at an initial position of the focus of the optical system, and moves the position of the focus of the optical system in a direction opposite to the one direction if a peak value is not indicated in the distribution of the plurality of evaluation values corresponding to the plurality of positions of the focus of the optical system by the movement in the one direction.

4. The microscope system according to claim 1, wherein the control unit reduces the sensitivity parameter when the evaluation value reaches the upper limit value by the movement of the focus of the optical system in the optical axis direction.

5. The microscope system according to claim 1, further comprising:

an image data generation unit for generating image data based on the pixel data output from the pixel data output unit; and a display unit for displaying an image based on the image data generated by the image data generation unit; wherein the control unit moves the focus of the optical system so that the focus of the optical system coincides with the position detected.

6. The microscope system according to claim 1, wherein the control unit calculates the evaluation value at a plurality of positions in the optical axis direction of the optical system by moving the focus of the optical system in one direction from the position detected, determines the position of the focus of the optical system at a time point the calculated evaluation value becomes smaller than or equal to a detection limit defined in advance as a movement limit position on one side, calculates the evaluation value at a plurality of positions in the optical axis direction of the optical system by moving the position of the focus of the optical system in a direction opposite to the one direction from the position detected, and determines the position of the focus of the optical system at a time point the calculated evaluation value becomes smaller than or equal to the detection limit as a movement limit position on other side.

7. A focus position detection method for detecting a position of a focus of an optical system arranged in a microscope system, the method comprising the steps of:

irradiating a light emitted from a light source on an observing target while collecting the light through the optical system, and guiding the light irradiated on the observing target to a light receiving element;

outputting pixel data corresponding to a plurality of pixels based on an output signal of the light receiving element; and setting a sensitivity parameter for adjusting a value of the pixel data by controlling gain of the light receiving element by a control unit, and moving a focus of the optical system relative to the surface of the observing target to a plurality of positions in an optical axis direction of the optical system by the control unit; wherein the step of moving includes, calculating an evaluation value using a value of the pixel data corresponding to a predetermined number of pixels of the pixel data output from a pixel data output unit at each position of the focus of the optical system by the control unit, assuming the calculated evaluation value as the evaluation value corresponding to the position if the calculated evaluation value is within a range between an upper limit value defined in advance and a lower limit value defined in advance, reducing the gain of the light receiving element so that the calculated evaluation value is within the range if the calculated evaluation value reaches the upper limit value, correcting the evaluation value calculated at each position of the focus of the optical system based on a number of reductions of the gain of the light receiving element after reducing the sensitivity parameter according to the reduction of the gain of the light receiving element to have the corrected evaluation value as the evaluation value corresponding to each position, and detecting the position of the focus of the optical system indicating a peak value in a distribution of a plurality of evaluation values corresponding to the plurality of positions of the focus of the optical system by the control unit and setting the gain of the light receiving element automatically, wherein the control unit moves the focus of the optical system to the position of the focus indicating the peak value and searches an upper limit position and a lower limit position by moving the focus of the optical system in one direction of the Z direction while carrying out the gain adjustment of the light receiving element and sets the upper limit position and lower limit position with the adjusted gain of the light receiving element.

8. A focus position detection program that is present on a non-transitory computer-readable memory, the focus position detection program causing a processing device to execute a focus position detection process for detecting a position of a focus of an optical system arranged in a microscope system, the program causing the processing device to execute the processes of:

irradiating a light emitted from a light source on an observing target while collecting the light through the optical system, and guiding the light irradiated on the observing target to a light receiving element;

outputting pixel data corresponding to a plurality of pixels based on an output signal of the light receiving element; and setting a sensitivity parameter for adjusting a value of the pixel data by controlling gain of the light receiving element by the control unit, and moving a position of a focus of the optical system relative to the surface of the observing target in an optical axis direction of the optical system by the control unit; wherein the process of moving includes, calculating an evaluation value using a value of the pixel data corresponding to a predetermined number of pixels of the pixel data output from a pixel data output unit at each position of the focus of the optical system by the control unit, assuming the calculated evaluation value as the evaluation value corresponding to the position if the calculated evaluation value is within a range between an upper limit value defined in advance and a lower limit value defined in advance, reducing the gain of the light receiving element so that the calculated evaluation value is within the range if the calculated evaluation value reaches the upper limit value, correcting the evaluation value calculated at each position of the focus of the optical system based on a number of reductions of the gain of the light receiving element after reducing the gain of the light receiving element according to the reduction of the gain of the light receiving element to have the corrected evaluation value as the evaluation value corresponding to each position, and detecting the position of the focus of the optical system indicating a peak value in a distribution of a plurality of evaluation values corresponding to the plurality of positions of the focus of the optical system by the control unit and sets the gain of the light receiving element automatically, wherein the control unit moves the focus of the optical system to the position of the focus indicating the peak value and searches an upper limit position and a lower limit position by moving the focus of the optical system in one direction of the Z direction while carrying out the gain adjustment of the light receiving element and sets the upper limit position and lower limit position with the adjusted gain of the light receiving element.

\* \* \* \* \*